(12) United States Patent
Kanamori et al.

(10) Patent No.: US 7,909,382 B2
(45) Date of Patent: Mar. 22, 2011

(54) AUTOMOBILE

(75) Inventors: Jun Kanamori, Susono (JP); Osamu Fujimoto, Nisshin (JP)

(73) Assignees: Kanto Auto Works, Ltd., Kanagawa (JP); Toyota Jidosha Kabushiki Kaisha, Aichi (JP)

( * ) Notice: Subject to any disclaimer, the term of this patent is extended or adjusted under 35 U.S.C. 154(b) by 286 days.

(21) Appl. No.: 12/172,205

(22) Filed: Jul. 11, 2008

(65) Prior Publication Data

US 2009/0015049 A1    Jan. 15, 2009

(30) Foreign Application Priority Data

Jul. 14, 2007    (JP) ................................ 2007-185109

(51) Int. Cl.
  *B60N 2/12*    (2006.01)
(52) U.S. Cl. ................ 296/65.05; 296/65.16; 296/65.09
(58) Field of Classification Search ............... 296/65.03, 296/65.05, 65.01, 65.16, 69, 63, 65.09; 297/1, 297/183.2
  See application file for complete search history.

(56) References Cited

U.S. PATENT DOCUMENTS

| | | | | | |
|---|---|---|---|---|---|
| 1,894,103 | A | * | 1/1933 | Kuenzel | 296/24.33 |
| 6,053,555 | A | * | 4/2000 | Neale | 296/65.03 |
| 6,073,986 | A |   | 6/2000 | Neale et al. | |
| 6,209,943 | B1 | * | 4/2001 | Neale et al. | 296/65.01 |
| 6,224,132 | B1 | * | 5/2001 | Neale | 296/68.1 |
| 6,631,946 | B1 | * | 10/2003 | Neale | 297/15 |
| 7,000,968 | B2 | * | 2/2006 | Welch et al. | 296/68 |
| 7,578,535 | B2 | * | 8/2009 | Thomas et al. | 296/63 |
| 7,677,630 | B2 | * | 3/2010 | Kanamori et al. | 296/65.01 |
| 7,686,367 | B2 | * | 3/2010 | Neale | 296/64 |
| 2003/0214145 | A1 | * | 11/2003 | Schambre et al. | 296/63 |
| 2008/0265606 | A1 |   | 10/2008 | Kanamori et al. | |
| 2008/0277888 | A1 |   | 11/2008 | Kanamori et al. | |

FOREIGN PATENT DOCUMENTS

| | | |
|---|---|---|
| DE | 20020169 U1 | 4/2002 |
| EP | 0987140 A2 | 3/2000 |
| JP | 2001130303 A | 5/2001 |
| JP | 2003-182411 | 7/2003 |
| JP | 2004-106640 | 4/2004 |
| JP | 2006-015940 A | 1/2006 |

OTHER PUBLICATIONS

Partial Machine Translation of Japanese Publicaiton 2006-015940, printed Jun. 20, 2010.*
Office Action by Japan Patent Office in counterpart application JP 2007-185109, dated May 21, 2009. English Translation attached.
The extended European search report dated Mar. 8, 2010, in a counterpart European patent application No. 08160324.3 for Examiner consideration, citing Foreign Patent document Nos. 1-3 listed above and US 6224132 which has been cited by examiner on Jun. 24, 2010.

* cited by examiner

*Primary Examiner* — Jason S Morrow
(74) *Attorney, Agent, or Firm* — Chen Yoshimura LLP

(57) ABSTRACT

In an automobile having a seat cushion supporting the hip, and a seat back supporting the back, of a seated person wherein the seat back in its use position with the seat cushion folded thereon is lifted up to its non-use position in an upper part of the cabin, the seat back when moved from the use position to the non-use position is prevented from interfering with a seat disposed in its front. There is a guide means for guiding the seat back 12 so that it moves rearwards gradually when it is moved from the use position to the non-use position.

18 Claims, 15 Drawing Sheets

(a)

(b)

AUTOMOBILE

TECHNICAL FIELD

The present invention relates to an automobile equipped with a seat member which is disposed in a cabin so as to be movable between its use position adapted to support a seated person and its non-use position in an upper part of the cabin.

BACKGROUND ART

An automobile equipped with a seat member which is disposed in a cabin and supported movably between its use position and its non-use position that is in an upper part of the cabin has been known (see Patent Reference 1). For example, the seat member is made up as, e. g. a seat back supporting the back of a seated person or a seat cushion supporting the occupant's hip. An automobile of this type is capable of holding the seat member at the non-use position in the upper part of a cabin to provide a large space thereunder and to accommodate goods in the space efficiently.

An automobile of the form described above has been provided with a seat arm swingable or to be rotatable supported on the car body to support the seat member so that as the seat arm is turned, the seat member is turned about a pivot of the seat arm to move between the use and non-use positions.

In such a structure in which the seat member is turned having a large turning radius, if there is any object in front of the use position of the seat member, when the seat member is turned from its use position to its non-use position, the seat member may be interfered with such an object and cannot be moved to the non-use position. This applies likewise to when the seat member is turned from its non-use position to its use position.

For example, if a separate seat is disposed in front of the seat member and has its seat back largely inclined backwards, the seat member, when being turned, may be interfered with the seat back of that separate seat. In such a case, it is necessary first to turn that largely back inclined seat back forwards so as not to be hitted on by the seat member and then to turn the seat member. However, it is bother to incline the seat back of the separate seat every time when just to turn the seat member.

Reference Cited

Patent Reference 1: JP 2001-130303 A

DISCLOSURE OF THE INVENTION

It is an object of the present invention to provide an automobile of the type mentioned above, which eliminates the aforementioned disadvantages in the prior part.

There is provided in accordance with the present invention an automobile equipped with a seat member that is disposed in a cabin movably between its use position adapted to support a seated person and its non-use position in an upper part of the cabin, characterized in that it comprises: a seat arm supported to be rotatable about a center of turning on a car body and coupled to the seat member so that the seat member is movable towards and away from the center of turning with a variable distance between them as a seat distance; and a guide means for guiding the seat member so as to gradually decrease the seat distance as the seat member moves from the use position to the non-use position and to gradually increase the seat distance as the seat member moves from the non-use position to the use position.

Then advantageously, the guide means comprises a guide groove formed in an interior material disposed inside of the car body or the cabin thereof and the seat member has a pin protruding therefrom which is slidably fitted in the guide groove whereby when the seat member is moved between the use position and the non-use position, the pin slides moving in the guide groove to decrease or increase the seat distance.

There may also be provided an energizing means for energizing the seat member towards its center of turning of the seat arm when the seat member is moved from the use position to the non-use position.

Further in the automobile mentioned above, the seat arm may have a hollow part and a frame of the seat member may have a slide element securely connected thereto which is slidably fitted in the hollow part. The hollow part may have a spring fitted therein for energizing the slide element towards the center of turning of the seat arm. Moreover, the spring may constitute the energizing means.

Also in the automobile mentioned above, the seat member may be a seat back supporting the back of a seated person.

Further, the automobile mentioned above may comprise a seat cushion supporting the hip of the seated person, wherein the seat cushion is connected to the seat back to be rotatable between the use position adapted for the seated person thereon and the non-use position in which it is folded on the seat back, the seat back is disposed in the cabin so that with the seat cushion folded on the seat back, the seat back together with the seat cushion is movable between the use position and the non-use position at which the seat back with the seat cushion folded thereon is lifted up in the upper part of the cabin; and a handle arm disposed on a rear side of the seat back which is opposite to the surface supporting the back of the seated person wherein the handle arm is coupled to the seat back to be rotatable between its storage position in which it lies along the rear side of the seat back in the use position where its base ends lie lower than its free end and its use position at which the free end lies spaced apart from the rear side of the seat back.

When the seat member is in the use position, even if there is any object before the seat member, the present invention is possible to prevent the seat member from interfering with the object

EMBODIMENTS OF THE INVENTION

Figure 1:
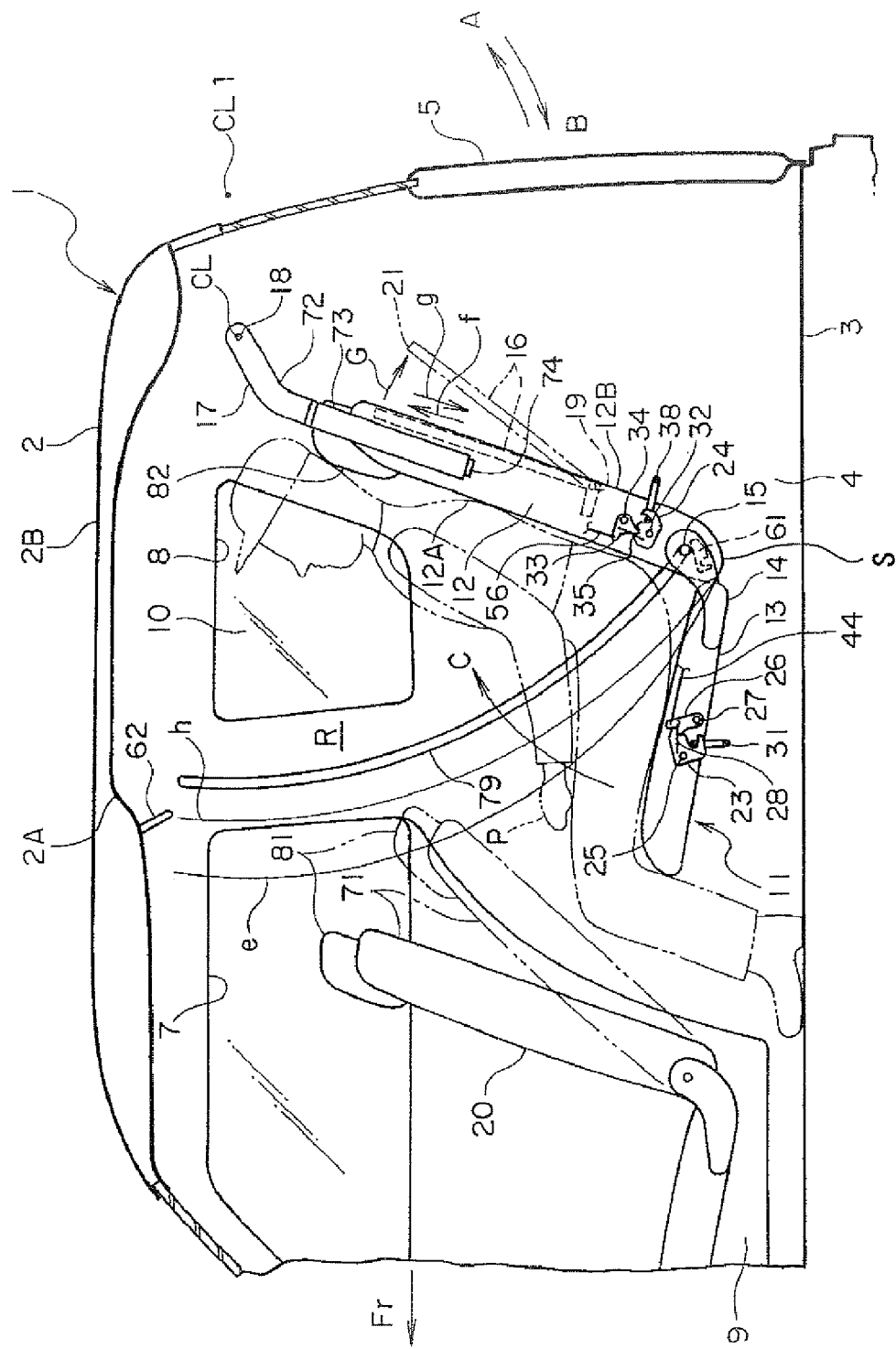
FIG. 1 is a diagrammatic cross sectional view of an automobile, illustrating the state in its cabin that a seat back and a seat cushion are at their use position.

Explanations are given in detail below of an automobile in embodiments with a seat member constructed of a seat back with reference to the Drawing Figures.

Figure 2:
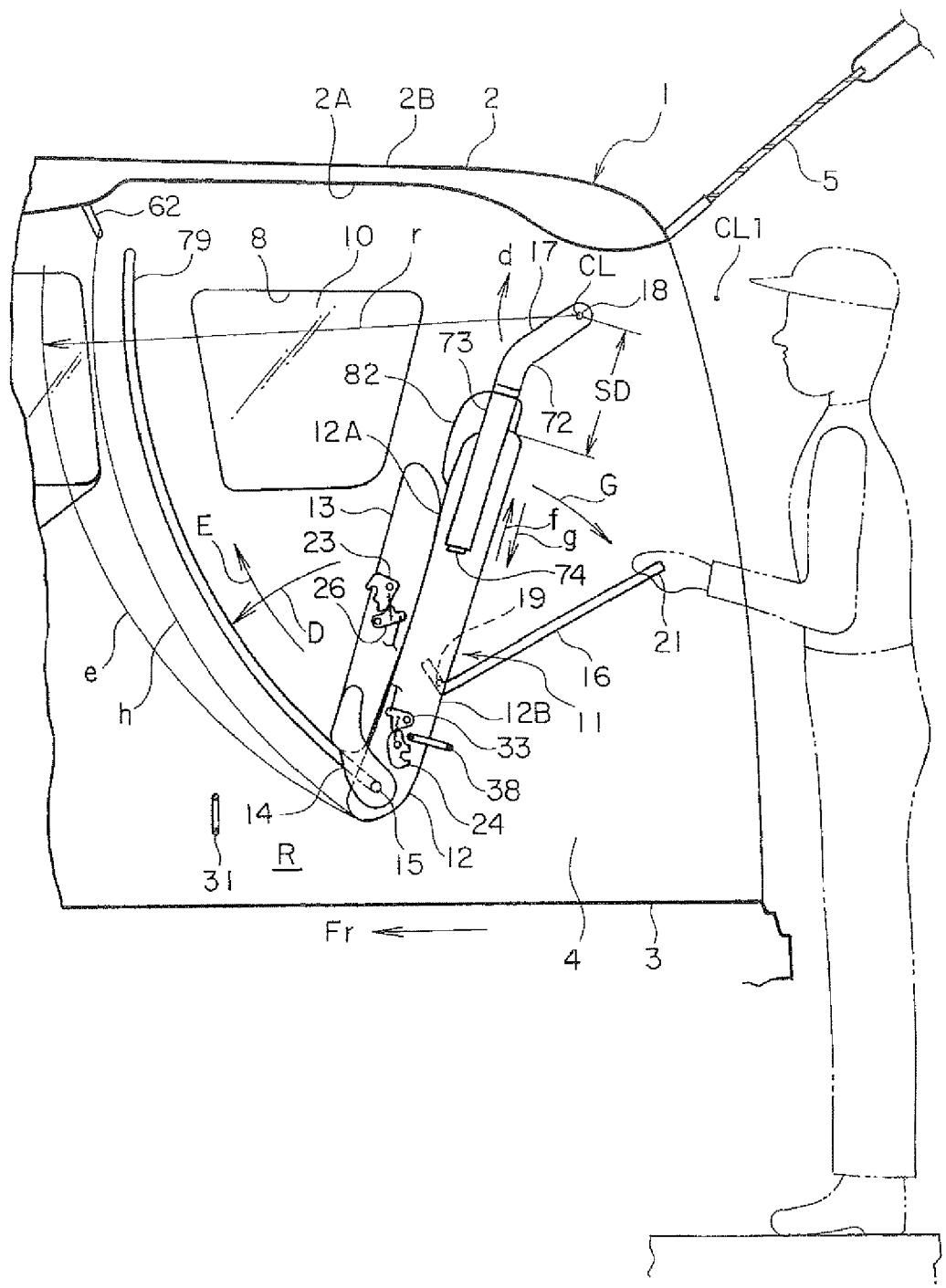
FIG. 2 is a diagrammatic cross sectional view similar to FIG. 1, illustrating the state that the seat cushion is turned into its non-use position where it is folded on the seat back.
Figure 3:
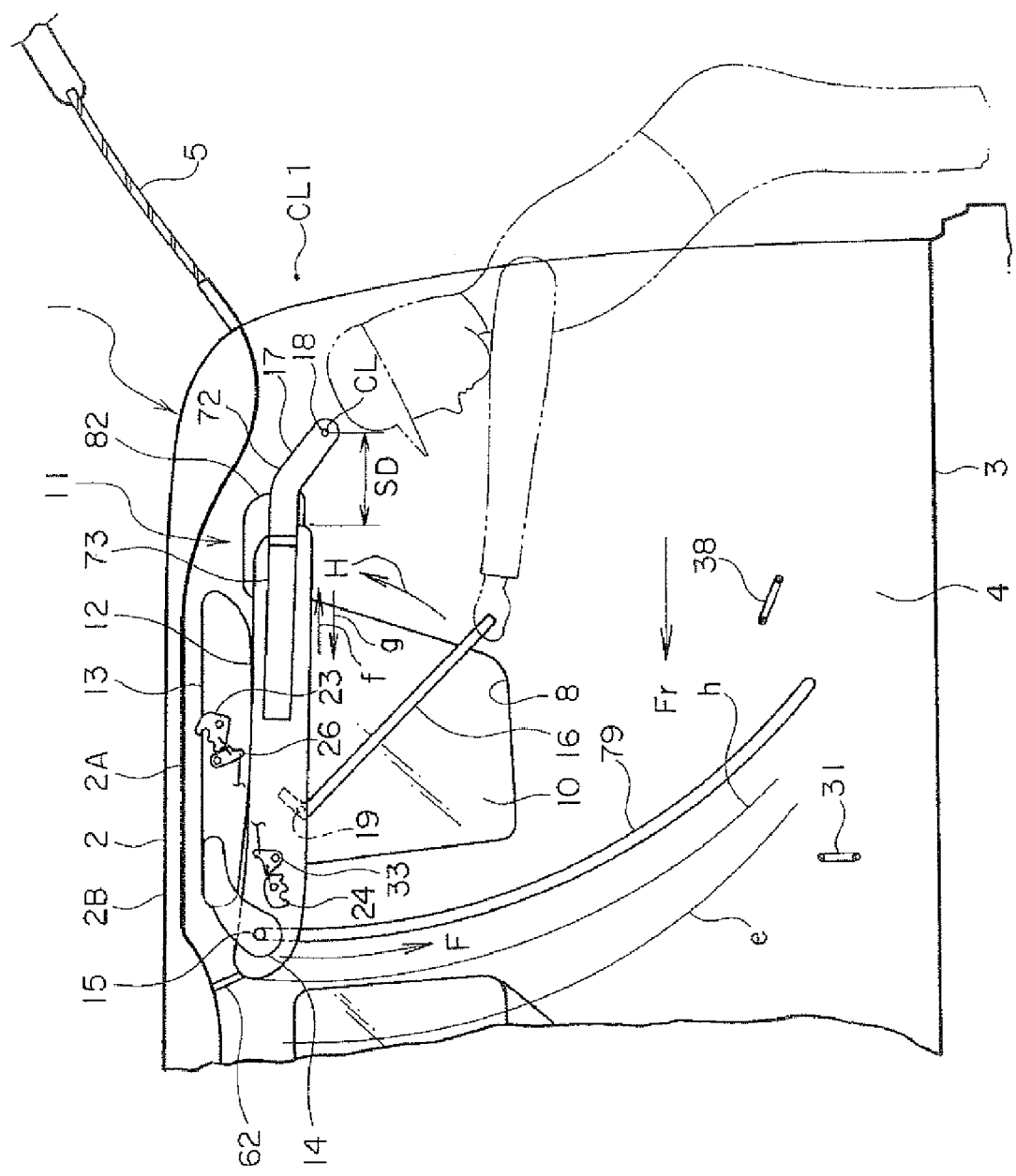
FIG. 3 is a diagrammatic cross sectional view similar to FIG. 1, illustrating the state that the seat back is brought to its non-use position in the upper part of the cabin.
Figure 4:
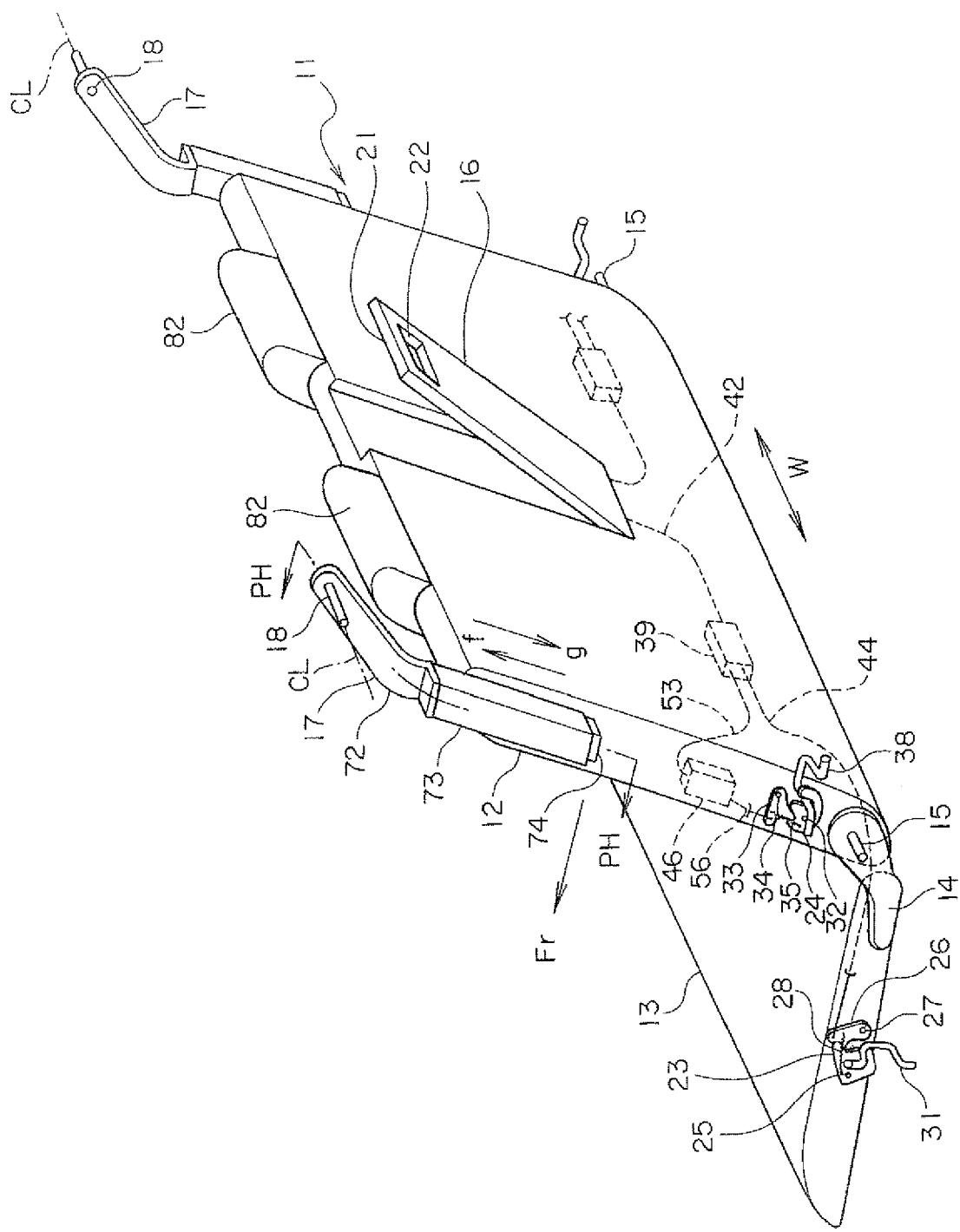
FIG. 4 is a perspective view of a seat seen obliquely rear.

FIGS. 1 to 3 diagrammatically illustrate in cross section an automobile with its cabin interior made apparent. In these Figures, character Fr indicates the direction in which the vehicle moves forwards. The vehicle has a width in a direction orthogonal to the forward direction Fr or perpendicular to the sheet of FIG. 1, 2, 3. In FIG. 4, this vehicle width direction is indicated by character W. The terms "front", "back" or "rear" used herein mean themselves with reference to the direction Fr in which the vehicle moves forwards.

The vehicle shown in FIG. 1 has a car body or main body 1 which as known per se comprises a variety of panels such as a roof panel 2 constituting the upper part of the main body 1, a floor panel 3 constituting the floor of a cabin R and side panels 4 constituting sides of the cabin R across the vehicle width direction. In FIGS. 1 to 3, only one side panel 4 is shown. The roof panel 2 is comprised of an inner panel 2A and an outer panel 2B fastened together. The car body 1 is provided at its rear opening with a back door 5 which is supported on the car body 1 swingably or to be rotatable so as to be open and closed in the directions of A and B. The car body 1 is further provided in a door opening 7 on each side panel 4 with a side door 9 supported on the car body 1 swingably or to be rotatable so as to be opened and closed, and in its rearwards with a window glass 10. Also, the inner surfaces of the side panels 4 may be covered with an interior material (not shown) and the inner surface of the inner panel 2A of the roof panel 2 covered with a ceiling material (not shown).

In the cabin R as shown in FIG. 1 there are arranged a front seat 20 and a rear seat 11 behind the front seat 20. The rear seat 11 as is the other seat 20 is comprised, as shown in FIG. 1, of a seat back 12 for supporting the back of a seated person, a seat cushion 13 for supporting the hip of a seated person and a head rest 82 attached at the top of the seat back. Such a seated person P on the seat 11 is shown by the two-dot chain lines on simplification in FIG. 1.

In the automobile of this embodiment, the seat back 12 is designed to constitute a seat member arranged in the cabin so as to be movable between its use position capable of supporting the seated person and its non-use position in the upper part of the cabin. The seat cushion 13 as will be described later is connected to the seat back 12 swingably or to be rotatable between its use and non-use positions. FIG. 1 shows the state that the seat cushion 13 and the seat back 12 together are at their use position in which the seat cushion 13 holds its horizontal altitude whereas the seat back 12 takes a substantially vertically rising altitude with respect to the seat cushion 13.

A portion of the seat back 12 which becomes the lowest in the state that the seat back 12 is at the use position is provided at both its widthwise sides with hinge pins 15 fixed to frames (not shown) of the seat back. Each of the hinge pins 15 as shown in FIG. 4 protrudes outwards from the respective widthwise side of the seat back 12. Also, the seat cushion 13 is provided at both its widthwise sides with brackets 14 fastened to cushion frames (not shown), respectively, and each bracket 14 is formed with a hole fitted with the respective hinge pin 15 so as to be rotatable relative to the latter.

The seat cushion 13 and the seat back 12, when in the use position shown in FIG. 1, are locked to the car body 1 by a first and a second locking element 23 and 24 and a first and a second striker 31 and 38 engaged therewith, respectively, as will be described later. In this state, the seat cushion 13 supports the hip of the seated person P and the seat back 12 supports the back of the person P.

As shown in FIGS. 1 to 4, the automobile in this embodiment has a pair of seat arms 17 disposed in the cabin R and each of which is supported swingably or to be rotatable on the respective side panel 4 of the car body 1 via a pivot pin 18 at its one end side. Moreover, the seat back 12, as will be described later, is attached to each seat arm 17 so as to be movable relative to the latter.

When the lock to the seat cushion 13 is released, the seat cushion 13 rotates in the direction indicated by the arrow C in FIG. 1 around the hinge pin 15 of the seat back 12 by the action of spiral spring (not shown), which is one example of a first energizing means provided around the hinge pins 15, and thereby occupies the position where the seat cushion is superposed on the seat back 12 positioned at the use position as shown in FIG. 2. The position of the seat cushion 13 at this time constitutes a non-use position thereof.

Further, when the lock to the seat back 12 is released, the seat back 12 rotates forwards together with the seat cushion 13 as indicated by the arrow E in FIG. 2 by an action of gas damper stays as a second energizing means provided between the seat back 12 and the car body 1, and thereby occupies the position where the seat back 12 is lifted in the upper part of the cabin R as shown in FIG. 3. The position of the seat back 12 at this time constitutes a non-use position thereof. Then, the seat cushion 13 lies folded on the seat back 12 and the seat back 12 is locked to the car body 1 by a third locking element 61 and a third striker 62 shown in FIG. 1 so that the seat back 12 together with the seat cushion is held at its non-use position. An explanation will be given later in detail of the third locking element 61 and the third striker 62.

When the seat back 12 together with the seat cushion 13 is to be moved from the use position to the non-use position as mentioned above and thus retracted, the seat arms 17 as seen from FIG. 2 are allowed to swing or turn in the direction of arrow d about a central axis of the pivot pin 18 as a center CL of swing or turning. As the arms are swung or turned, the seat back 12 is moved together with the seat cushion 13 in the direction of arrow E. An explanation will be given in detail later of the operation then effected. The center of turning Cl of the seat arm 17 is immobile in position relative to the car body 1.

Since the seat 11 is retracted and stored in an upper part of the cabin R as shown in FIG. 3, a large space is provided under the seat 11, so that goods (not shown) can be accommodated in this space efficiently. An operation reverse to that mentioned above can be performed to return the seat 11 to the use position shown in FIG. 1 and to use the seat 11. To wit, after the seat back 12 locked with the third locking element 61 is unlocked, it can be turned in the direction indicated by the arrow F in FIG. 3 to bring it to the position shown in FIG. 2 and then the seat cushion 13 can be turned about the hinge pin 15 in the direction indicated by the arrow D shown in FIG. 2 and thereby brought to the position shown in FIG. 1. Thus, the seat back 12 and the seat cushion 13 can be returned to their use position and then be locked to the car body 1 with the first and second locking elements 23 and 24 and the first and second strikers 31 and 38.

As mentioned above, the automobile in this embodiment is equipped with the seat 11 disposed in the cabin R, the seat 11 comprising the seat back 2 supporting the back of the seated person P and the seat cushion 13 supporting the hip of the seated person P. The seat cushion 13 is connected to the seat back 12 so that it can be turned between its use position where the person P can be seated and its non-use position where it is folded on the seat back 12. The seat back 12 is disposed in the cabin R so that it together with the seat cushion 13 can be moved between its use position where it can support the back of the seated person P and its non-use position where it together with the seat cushion 13 is lifted to the upper part in the cabin R. When the seat back 12 is in the non-use position, the seat cushion 13 lies folded on the seat back 12 where the seat cushion 13 and the seat back 12 hold their substantially horizontal altitude. In this manner, the seat back 12 as a seat member is disposed in the cabin R so that it can be moved between its use position where it can support the seated person P and its non-use position in the upper part in the cabin.

By the way, the seat back 12 shown in FIGS. 1 to 4 can be made integral with the seat arms 17 so that it may, together with the seat arms 17, be turned about the turning or swinging center CL and thereby turned between its use and non-use positions. However, if the seat back 12 is so turned, its lower end comes to be turned along an arc e, as shown in FIGS. 1-3, about the turning center CL, and a turning radius r, as shown as in FIG. 2, becomes large. Consequently, as mentioned previously, if the other seat 20 lies in front of the seat back 12 in the use position so that its own seat back 71 and head rest 81 supported thereby are reclined as shown by the two-dot chain lines in FIG. 1, turning the seat back 12 about the turning center CL of the seat arm 17 causes the seat back 12 to hit on the seat back 71 of the other seat 20 by means of the seat cushion 13. For avoiding the hitting, it is only after the seat back 71 of the other seat 20 must be turned forwards as shown in the solid line in FIG. 1 that the seat back 12 shown in FIG. 2 can be turned together with the seat cushion 13 to the non-use position shown in FIG. 3. Thus, when the seat back is retracted and stored, the operation becomes complicated since the seat back 71 of its front seat 20 need be operated.

Figure 13:
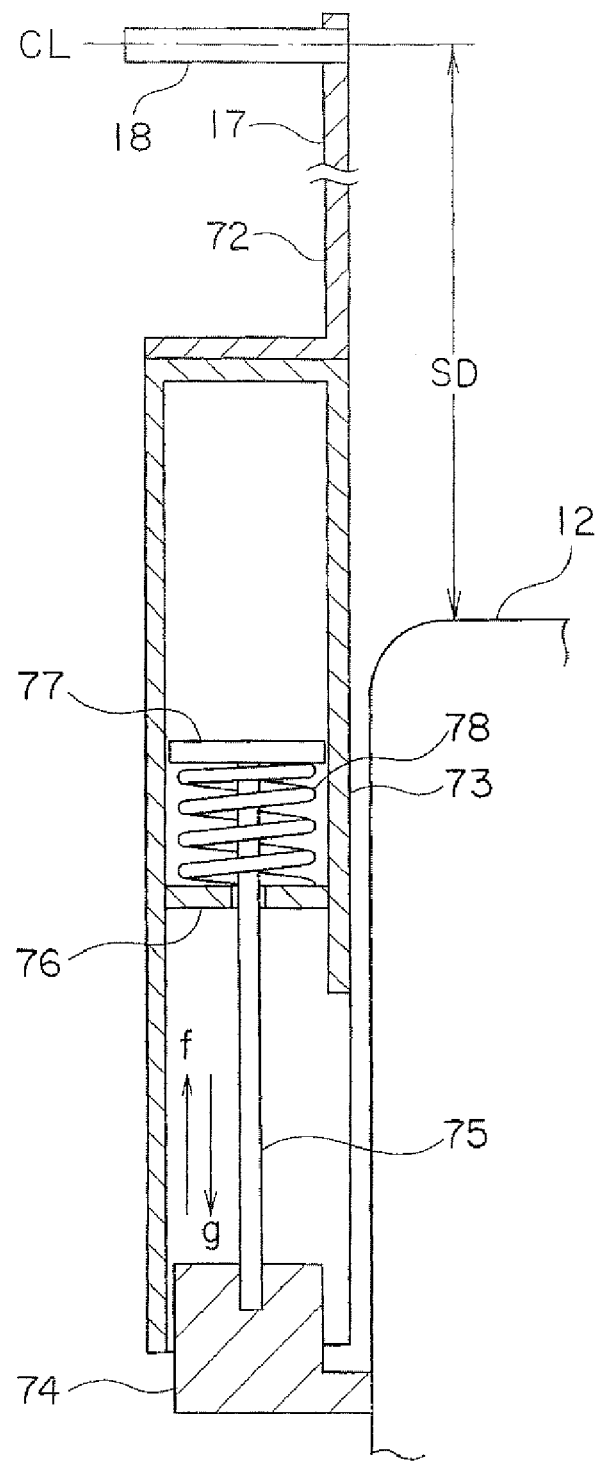
FIG. 13 is an enlarged cross sectional view taken along the line PH in FIG. 4.

Accordingly, the seat arm 17 having its base part 72 on which the pivot pin 18 projects is provided with a hollow part 73 made integral with the base part 72 and formed to be hollow inside. The hollow part 73 is opened in its lower portion. As shown in FIG. 13, a slide element 74 fastened to the frame (not shown) of the seat back 12 is slidably fitted in the hollow part 73 so as to be movable in the directions of arrows f and g. Thus, the seat arm 17 has the hollow part 73, and the seat member, here the seat back 12, has the slide element 74 fastened to its frame, the slide element 74 being slidably fitted in the hollow part 73.

As shown also in FIG. 13, the slide element 74 has a rod 75 integrally fastened thereto and the rod 75 slidably passes through a first spring bearing 76 fastened to the hollow part 73 and extends inside of the hollow part 73. The upper end of the rod 75 is connected to a second spring bearing 77. The second spring bearing 77 is movably disposed in the hollow part 73. A compression coil spring 78 is disposed between the first and second spring bearings 76 and 77. The slide element 74 is thereby energized in the direction of arrow f towards the center of turning CL.

Figure 14:
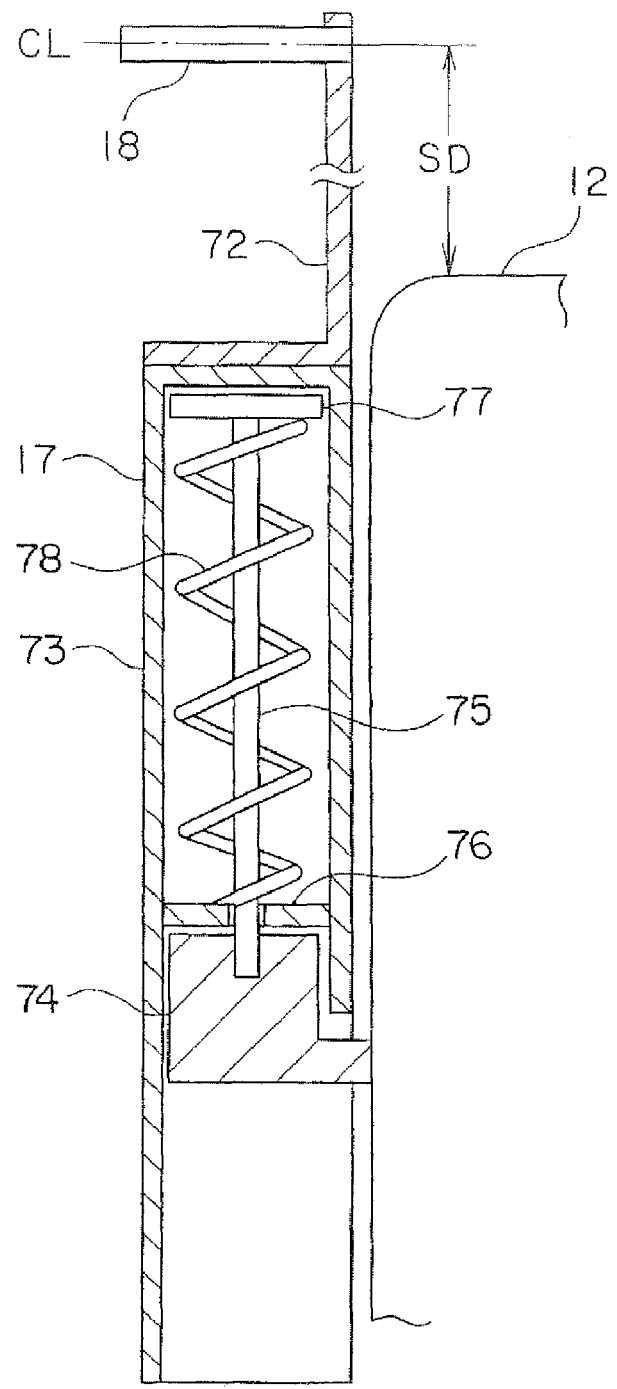
FIG. 14 is a cross sectional view similar to FIG. 13, illustrating the state that the seat back has reached its non-use position.

Also, since the slide element 74 connected to the seat back 12 and moreover made slidably movable to the seat arm 17, the seat back 12 as a seat member is attached to the seat arm 17 so as to be movable towards and away from the center CL of turning of the seat arm 17 as shown by the arrows f and g in FIGS. 1 to 4 and FIG. 13. Note that FIG. 13 shows the state of the seat arm 17 when the seat back 12 is in its use position shown in FIGS. 1 and 2 and FIG. 14 shows the state of the seat arm when the seat back 12 is in its non-use state shown in FIG. 3.

The construction described above in connection with FIG. 13 equally applies to the seat arm 17 positioned at the widthwise right hand side in FIG. 4. Since the construction and operation are the same as those shown in FIG. 13, the description of the construction and operation of the seat arm 17 at the right hand side is here omitted.

On the other hand, each of the side panels 4 defining the sides of the cabin R as shown in FIGS. 1 to 3 and FIG. 15(*a*) is provided with a guide groove 79. The guide groove 79 is shaped in an arc of circle. A center of the circle is a point CL1 behind the center of turning CL of the seat arm 17 in the horizontal direction toward to rear side of the automobile. When the seat back 12 is in the use position, a position S is at the lowest of the seat back 12. In this case, the distance between the position S and the center of turning CL is shorter than the distance between the position S and the point CL1. Accordingly, an arc h, which is passing through the position S and the center is the point CL1, is disposed inside an arc e which the center is the point CL. In other words, the arc h is disposed towards the rear side of the automobile from the arc e. In the embodiment, the arc of the guide groove 79 extends along with the arc h. The guide groove 79 is disposed behind the arc h.

The guide groove 79 extends on the side panel 4 so as to guide the seat back 12 from the use position to the non-use position. More specifically, the guide groove 79 extends on the side panel 4 from the bottom region about the floor panel to the upper region about roof panel.

Figure 15:
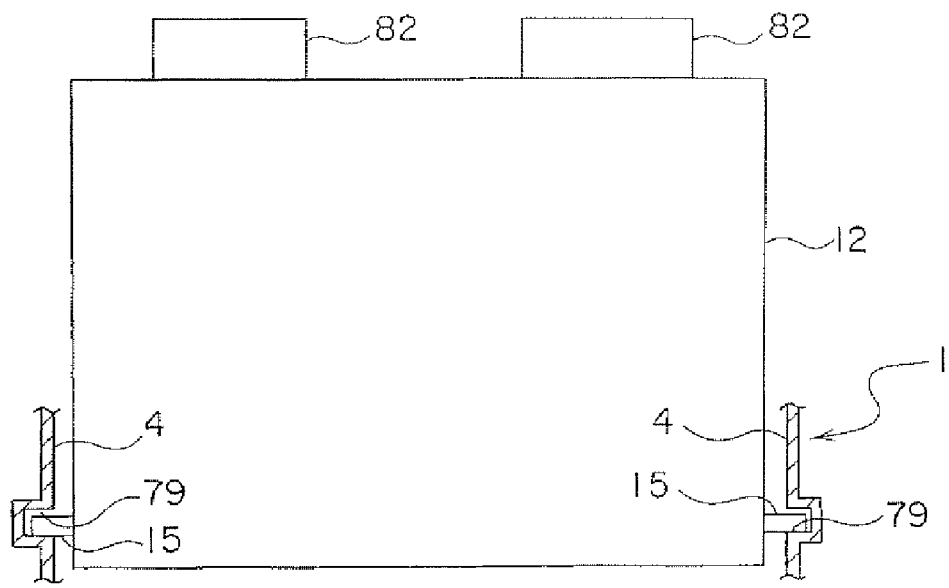
FIG. 15 shows a diagrammatic and partly cross sectional view of a seat back as seen from the rear.
Figure 15:
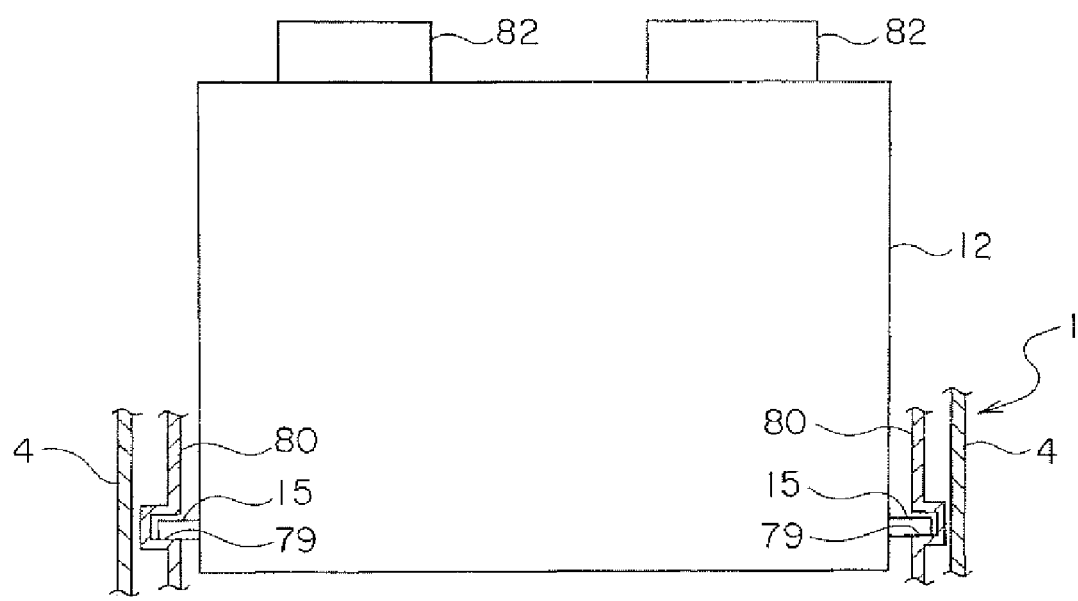

In a case, an interior material 80 made of, e. g., a resin, is disposed to cover the inside of each side panel 4 as shown in FIG. 15(*b*), the guide groove 79 is formed in each interior material. In each such guide groove 79, the hinge pins 15 projecting from the seat back 12 is slidably fitted so as to be guided thereby. A pin other than the hinge pin 15 formed on the seat back 12 may be slidably fitted in each such guide groove 79. The point CL1 will be referred to hereinafter as the center of arc.

As the seat back 12 moves from the use position shown in FIG. 2 to the non-use position shown in FIG. 3, each hinge pin 15 slides in the respective guide groove 79. Then, each hinge pin 15 can move in the respective guide groove 79 without hindrance or smoothly because whereas the center of turning CL and the center CL1 of arc h of the arcuately extending guide groove 79 are deviated in position from each other, the seat back 12 is coupled to the seat arm 17 so as to be movable towards and away from the center of turning CL. Each hinge pin 15 can also slide moving in the respective guide groove 79 smoothly likewise while the seat back 12 is moving from the non-use position shown in FIG. 3 to the use position shown in FIG. 2.

As shown in FIGS. 2, 3, 13 and 14, the distance between the center CL of turning of the seat arm 17 and the seat back 12 as a seat member which is thus variable will be referred to as a seat distance SD. Since as mentioned above the center CL1 of arc of each guide groove 79 lies rearwards of the center CL of turning of the seat arm 17, the seat distance SD is gradually reduced as the seat back 12 together with the seat cushion 13 is moved from the use position shown in FIG. 2 to the non-use position shown in FIG. 3. The seat distance SD is the smallest when the seat back 12 has reached the non-use position shown in FIG. 3. Mention is made in detail of the operation then effected.

When the seat back 12 is at the use position shown in FIG. 2, the seat back 12 is the most distant from the center Cl of turning of the seat arm 17. For this sake, as shown in FIG. 13 the second spring bearing 77 integrally fixed via the rod 75 to the slide element 74 fastened to the seat back 12 lies the closest to the first spring bearing 76, compressing and deforming the compression coil spring 78 to the maximum.

As the seat back 12 is moved towards the non-use position shown in FIG. 3, with the hinge pin 15 being guided in the guide groove 79 the seat back 12 is gradually moved towards the center CL of turning of the seat arm 17. For this sake, the second spring bearing 77 integrally coupled to the seat back 12 by means of the slide element 74 and the rod 75 comes gradually away from the first spring bearing 76, elongating the compression coil spring 78 gradually. When the seat back 12 reaches the non-use position shown in FIG. 3, the seat back 12 comes the closest to the center CL of turning of the seat arm 17. The relation in position then taken between the seat arm 17, its interior components and the seat back 12 is as shown in FIG. 14. As is apparent from FIG. 14, the second spring bearing 77 integral with the seat back 12 lies the most distant from the first spring bearing 76, making the full length of the compression coil spring 78 the largest. In this way, as the seat back 12 is moved towards the non-use position, the seat distance SD is being gradually reduced. With such a construction, it is thus possible for the longitudinal position of the seat back 12 which has reached the non-use position to be shifted rearwards of the longitudinal position of the seat back 12 which has been brought to the non-use position when the seat back 12 is fixed integral with the seat arm 17 and then turned or swung about its center of turning CL.

Conversely, as the seat back 12 is moved from the non-use position shown in FIG. 3 to the use position shown in FIG. 2, the seat distance SD is gradually increased. And, when the seat back 12 has reached the use position, the seat SD becomes the longest. As the seat back 12 is moved from the non-use position to the use position, with each hinge pin 15 being guided in the respective guide groove 79 the seat back 12 is gradually moved away from the center CL of turning of the seat arm 17 with the result that the second spring bearing 77 shown in FIG. 14 comes gradually closer to the first spring bearing 76, increasing the amount of compression of the compression coil spring 78. When the seat back 12 reaches the use position shown in FIG. 2, the seat back 12 lies the most distant from the center CL of turning of the seat arm 17 and the second spring bearing 77 as shown in FIG. 13 comes the closest to the second spring bearing 77, compressing the compression coil spring 78 to the maximum. In this way, as the seat back 12 approaches the use position, the seat distance SD becomes gradually longer.

A guide means is thus provided which may comprised of the guide groove 79 to guide the seat back 12 so as to be moved towards and away from the center of turning of the seat arm 17 as mentioned above.

In the construction mentioned above, the lower end of the seat back 12 which becomes the lowest when the seat back 12 is at the use position turns or turnings along a trajectory h behind an arc e as shown in FIGS. 1 to 3 when the seat back 12 is moved between the use position and the non-use position. For this sake, when the seat back is moved between the use position and the non-use position, if the seat back 71 of the front seat 20 is largely inclined back as indicated by the two-dot chain lines in FIG. 1, there is no interference of the seat back 12 with the front seat back 71. Consequently, there is no need to turn forwards the seat back 71 of the front seat 20 in advance of moving the seat back 12 from the use position to the non-use position, making it at ease to operate turning the seat back 12.

To sum up the above, the automobile according to this embodiment is provided with a guide means which guides the seat back 12 as a seat member so as to gradually reduce the seat distance SD when the seat member is moved from its use position to its non-use position and to gradually increase the seat distance SD when the seat member is moved from the non-use position to the use position. Specifically, the guide means in this embodiment may comprise a guide groove 79 formed in an interior material 80 disposed over the inner surface of a car body 1 or its cabin R. A pin 15 protruding from the seat member is slidably fitted in the guide groove 79 to slide moving in the guide groove 79 and the guide groove is so formed that moving the seat member between the use and non-use positions may increase or decrease the seat distance SD.

Also, a seat arm 17 is provided having a hollow part 73 in which a compression coil spring 78 is fitted to act as an energizing means for energizing the seat member as the beat back 12 towards a center CL of turning of the seat arm 17 when the seat member is moved from the use position to the non-use position. The compression coil spring 78 which is held compressed between a first and a second spring bearing 76 and 77 acts to energize a slide element 74 towards the center CL of turning of the seat arm 17 whereby the seat back 12 coupled integrally to the slide element 74 is energized towards the center CL of turning of the seat arm 17. When the seat back 12 is lifted from the use position towards the non-use position, such an energizing means which utilizes a spring force acting on the seat back 12 facilitates forcing it towards the center CL of turning of the seat arm 17.

The automobile of this embodiment may also be provided with a handle arm 16 for the purposes of easy operation when the seat back 12 having a seat cushion 13 folded thereon as shown in FIG. 2 is lifted towards an upper part of the cabin shown in FIG. 3 and when the seat back 12 with the seat cushion is lifted down again to the position shown in FIG. 2. Assuming that with a seated person P on the seat 11 as shown in FIG. 1, the surface of seat back 12 that supports the back of the seated person P is referred to as the seat back supporting surface 12A and its opposite surface is referred to as the seat back rear surface 12B, the handle arm 16 is mounted on a side of the seat back rear surface 12B. Moreover, the base end of the handle arm 16 which is the lowest when the seat back 12 is at the use position shown in FIG. 1 is coupled to the seat back frame of the seat back 12 so as to permit the handle arm 16 to turn around the base end. Also, as shown in FIG. 4, the handle arm 16 is formed at the side of its free end 21 with a hole 22 which forms a grip for the handle arm 16.

When the seat 11 is used by being seated by the P, the handle arm 16 is normally retracted and stored in its storage site positioned in and along the seat back rear surface 12B as indicated by the broken lines in FIG. 1. Then, the handle arm 16 is held at the storage site with a locking element (not shown). The locking element used may be a rocking hook rotatably supported on the seat back rear surface 12B. The locking hook may hold the handle arm in the storage position to lock it and may be turned and disengaged from the locking arm 16 to unlock the locking arm 16.

When the seat back 12 and the seat cushion 13 are to be lifted up to the upper part of the cabin as mentioned above, first the back door 5 shown in FIG. 1 is turned in the direction of arrow A to the open position shown in FIG. 2. Next, an operator indicated on simplification by the two-dot chain lines in FIG. 2 puts hands in the opening at the rear side of the car body opened by opening the back door 5 to turn the locking hook and, after unlocking on the handle arm 16, puts fingers on the grip formed by the hole 22 (FIG. 4) in the handle arm 16 to turn the handle arm 16 in a direction in which its free end 21 is moved back as shown by the arrow G in FIG. 1 and to turn the handle arm 16 to its use position. Then, the handle arm 16 is held at the use position on striking on a stopper (not shown) provided on the seat back. An intermediate state of the handing arm 16 to which it is turned from its storage position prior to reaching the use position is indicated by the two-dot chain lines in FIG. 1. Also, the handle arm 16 in this intermediate position is shown in FIG. 4.

The operator may bring the handle arm 16 to its use position and, on unlocking the first and second locking elements 23 and 24 for the seat cushion 13 and the seat back 12 and turning the seat cushion 13 to its non-use position shown in FIG. 2, may, with the handle arm 16 held gripped, lightly push this towards the front of the car body 1. Then, the action of gas damper stay mentioned previously allows the seat back 12 together with the seat cushion 13 to turn in the direction of arrow E and thereby seat back 12 is lifted to the non-use position shown in FIG. 3. Subsequently, the operator may turn the handle arm 16 in the direction of arrow H to store it in the storage position and turn the locking hook to lock the handle arm 16 in the storage position. A reverse operation allows the seat back 12 together with the seat cushion 13 to easily turn to their use positions.

As mentioned above, the handle arm 16 is held supported by the seat back 12 over and between its storage position lying along the seat back 12 and its use position in which its free end 21 lies away from the seat back 12. More specifically, the base end of the handle arm 16 which lies lower when the seat back 12 is in its use position is coupled rotatably to the seat back 12 so as to allow the handle arm 16 to be swung, so that the handle arm 16 may turn between its storage position lying along the seat back rear surface 12B and its use position in which its free end 21 lies away from the seat back rear surface 12B. This allows the operator to easily turn the seat cushion 13 and the seat back 12 to an upper part of the cabin and alternatively to easily turn the seat cushion 13 and the seat back 12 downwards in the cabin, upon holding the handle arm 16 in its use position with hand. Since the handle arm 16 is located on a side of the seat back rear surface 12B, if it is large-sized as shown in FIG. 4, it could then be no obstacle to a seated person. Making the handle arm 16 large in size in this way allows the operator to hold the handle arm 16 with hand and turn the seat back 12 and the seat cushion 13 while keeping its posture at ease.

As mentioned above, the automobile according to this embodiment is made so as to allow an operator upon opening the back door 5 to put it hand or hands in an opening thus opened at the vehicle back side and then to cause the seat back 12 to move between its use and non-use positions. In this case, the seat back 12 when stored in its non-use position lies the closest to the center CL of turning of the seat arm 17, namely at a position rearwards of the car body 1. This allows the operator to easily operate turning the seat back 12 on putting its hand in the opening at the car body back side.

While constructing the seat arm 17 to be immovable to the seat back 12 and the allowing the seat back 12 to turn about the center CL of turning of the seat arm 17 causes the seat back 12 which has reached its non-use position to lie ahead of the seat back 12 shown in FIG. 3, forcing the operator to largely lean forwards to operate turning the seat back 12 at a loss of its operability, the automobile is made in this embodiment to eliminate such a problem.

Figure 5:
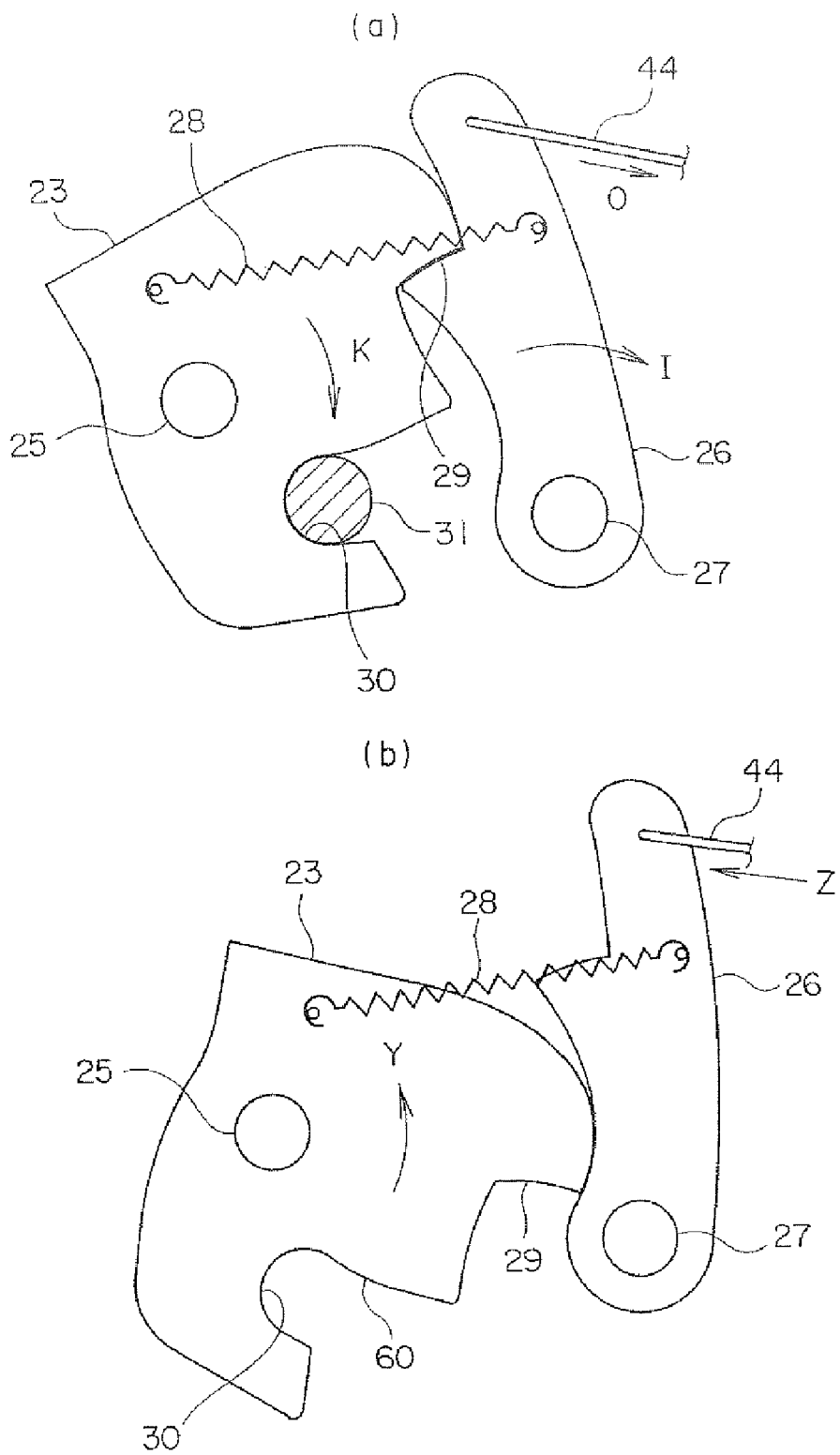
FIG. 5 shows explanatory view illustrating actions of a first locking element and a first pole.
Figure 6:
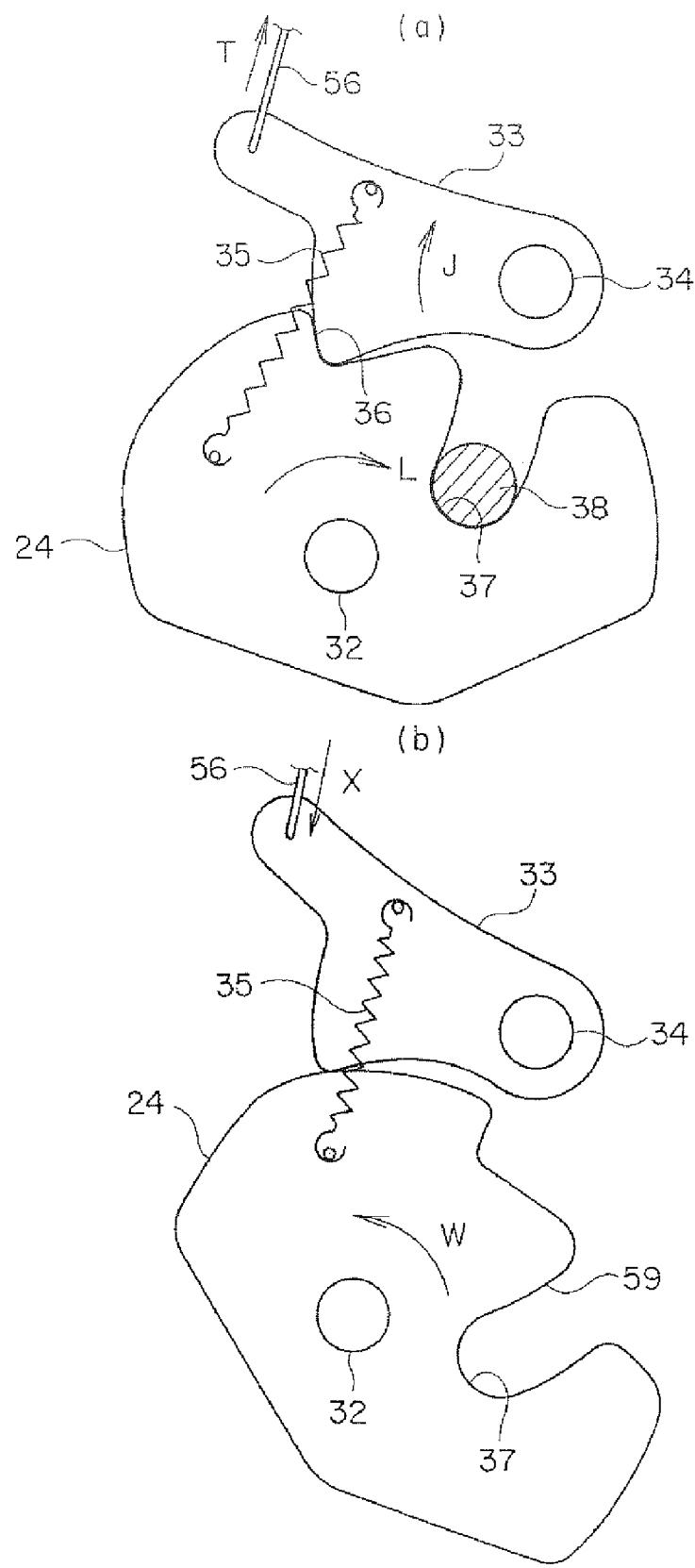
FIG. 6 shows explanatory view illustrating actions of a second locking element and a second pole.

Apropos, the seat cushion 13 and the seat back 12 as shown in FIGS. 1 and 4 are provided at each of their widthwise sides with a first and a second locking element 23 and 24 as mentioned previously. FIG. 5 is an enlarged view showing the first locking element 23 and its associated construction, and FIG. 6 is an enlarged view showing the second locking element 24 and its associated construction.

As seen in FIGS. 1 and 4 and FIG. 5(a), the first locking element 23 is rotatably supported on a cushion frame (not shown) of the seat cushion 13 via a pin 25. Adjacent to the first locking element 23, a first pole 26 is rotatably supported on the cushion frame of the seat cushion 13 via a pin 27. The first locking element 23 and the first pole 26 have a first and a second end of a first spring means comprising of a tension spring attached thereto, respectively.

Figure 7:
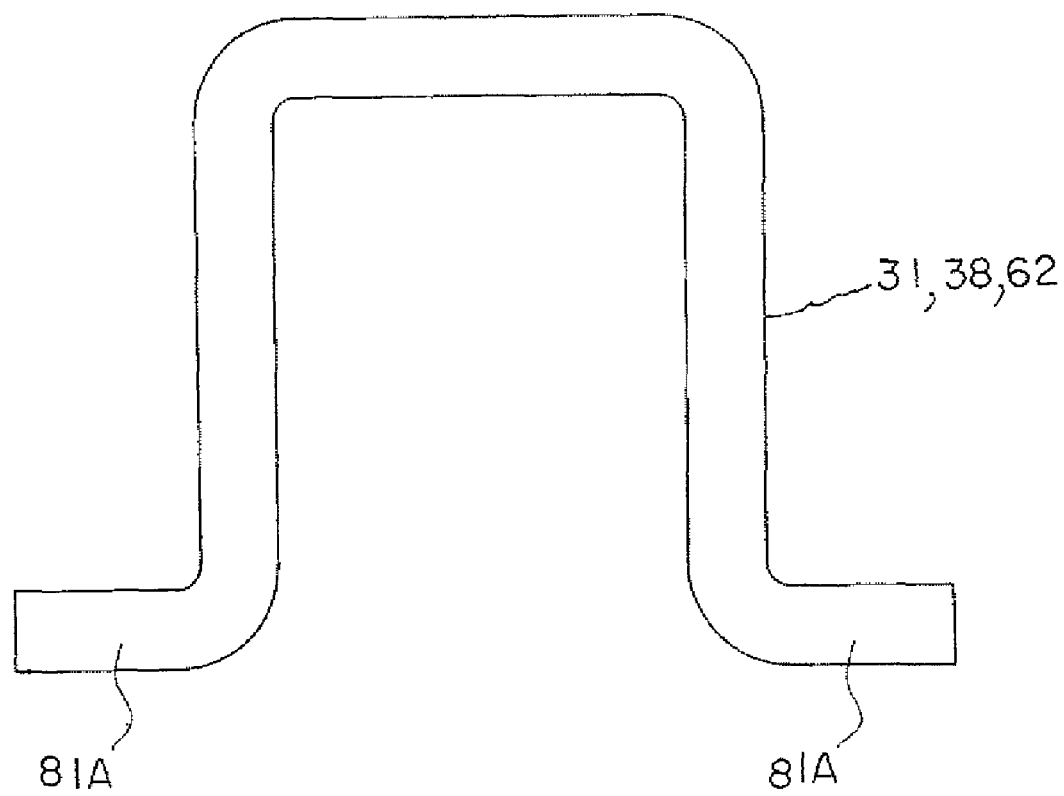
FIG. 7 is a front view of a striker.

When the seat cushion 13 is in its use position shown in FIG. 1, a hook portion of the first pole 26 as shown in FIG. 5(a) is engaged with an engagement portion 29 cut out of the first locking element 23 under an action exerted by the first spring means 28, thereby inhibiting the first locking element 23 from rotating. And, a first striker 31 fastened to a side panel 4 of the car body 1 is engaged with an engagement recess 30 formed of the first locking element 23. This holds the seat cushion 13 locked to the car body 1. Then, the first locking element 23 takes its locked position and the first pole 26 takes its engagement position. The first striker 31 as shown in FIG. 7 has its base ends 81A shaped substantially in the form of U fastened to the side panel 4 of the car body 1. The engagement recess 30 of the first locking element 23 is engaged with the first striker 31.

The second locking element 24 as shown in FIGS. 1 and 4 and FIG. 6(a) is also rotatably supported on a frame (not shown) of the seat back 12 via a pin 32. Adjacent to the second locking element 24, a second pole 33 is rotatably supported on the frame of the seat back 12 via a pin 34. The second locking element 24 and the second pole 33 have a first and a second end of a second spring means 35 comprising of a tension spring attached thereto, respectively.

When the seat back 12 is in its use position shown in FIG. 1, a hook portion of the second pole 33 as shown in FIG. 6(a) is engaged with an engagement portion 36 cut out of the second locking element 24 under an action exerted by the second spring means 35, thereby inhibiting the second locking element 24 from rotating. And, a second striker 38 fastened to a side panel 4 of the car body 1 is engaged with an engagement recess 37 formed of the second locking element 24. This holds the seat back 12 locked to the car body 1. Then, the second locking element 24 takes its locked position and the second pole 33 takes its engagement position. The second striker 38 as shown in FIG. 7 has its base ends 81A shaped substantially in the form of U fastened to the side panel 4 of the car body 1. The engagement recess 37 of the second locking element 24 is engaged with the second striker 38.

Thus, the automobile in this embodiment as mentioned above is provided with a first locking element 23 which is engageable with a first striker 31 fixed to the car body 1 when the seat cushion 13 is in its use position to lock the seat cushion 13 on the car body 1 and a second locking element 24 which is engageable with a second striker 38 fixed to the car body 1 when the seat back 12 is in its use position to lock the seat back 12 on the car body 1.

Here, it should be noted that turning the first pole 26 around the pin 27 in the clockwise direction as indicated by the arrow I in FIG. 5(a) causes the hook of the first pole 26 to disengage from the engagement portion 29 of the first locking element 23. This causes the first locking element 23 under the tensile action of the first spring means 28 to turn around the pin 25 in the direction indicated by the arrow K in FIG. 5(a) and then to take the position indicated in FIG. 5(b). This in turn causes the engagement recess 30 of the first locking element 23 to disengage from the first striker 31, thereby unlocking the seat cushion 13 from the first locking element 23. The position the first locking element 23 then takes is its unlocking position. The position the first pole 26 then takes is its disengaging position.

Likewise, turning the second pole 33 around the pin 34 in the clockwise direction as indicated by the arrow J in FIG. 6(a) causes the hook of the second pole 33 to disengage from the engagement portion 36 of the second locking element 24. This causes the second locking element 24 under the tensile action of the second spring means 35 to turn around the pin 32 in the direction indicated by the arrow L in FIG. 6(a) and then to take the position indicated in FIG. 6(b). This in turn causes the engagement recess 37 of the second locking element 24 to disengage from the second striker 38, thereby unlocking the seat back 12 from the second locking element 24. The position the second locking element 24 then takes is its unlocking position. The position the first pole 33 then takes is its disengaging position.

As mentioned above, the first locking element 23 is supported on the seat cushion 13 rotatably between the locking position at which its engagement recess 30 is engaged with the first striker 31 to lock the seat cushion 13 on the car body 1 and the unlocking position at which the engagement recess 30 is disengaged from the first striker 31 to unlock the seat cushion 13 from the car body 1. The second locking element 24 is supported on the seat back 12 rotatably between the locking position at which its engagement recess 37 is engaged with the second striker 38 to lock the seat back 12 on the car body 1 and the unlocking position at which the engagement recess 37 is disengaged from the second striker 38 to unlock the seat back 12 from the car body 1.

Here, where both the seat back 13 and the seat cushion 12 are locked in their use position, the operator may turn the handle arm 16 from its storage position towards its use position. Then, when the handle arm 16 comes to the intermediate position indicated by the two-dot chain lines in FIG. 1, the first pole 26 as shown in FIG. 5(b) will turn to its disengaging position and the first locking element 23 will turn to its unlocking position. This unlocks the seat cushion 13. Then, when the handle arm 16 is turned to its use position shown in FIG. 2, the second pole 33 will turn to its disengaging position and the second locking element 24 will turn to its unlocking position, as shown in FIG. 6(b). This unlocks the seat back 12. Thus, cooperating with the handle arm 16 as it turns, an unlocking means for unlocking the first and second locking elements 23 and 24 is provided for the seat 11, of which a specific construction will be mentioned later in detail. It is also possible to configure that the second locking element 24 turns to its unlocking position to unlock the seat back 12 when the handle arm 16 comes to a position between the intermediate position indicated by the two-dot chain lines in FIG. 1 and the use position shown in FIG. 2.

By providing the unlocking means mentioned above to have a difference in time between unlocking the first locking element 23 and unlocking the second locking element 24, it is possible first to unlock the seat cushion 13 and then to unlock the seat back 12. Thus, when the handle arm 16 is turned towards its use position, it is possible first to turn the seat cushion 13 to its non-use position in which it is folded on the seat back 12 under the spiral spring action mentioned before and then to turn the seat back in the direction indicated by the arrow E in FIG. 2 under the action of the gas damper stay mentioned before, thereby bringing it to its non-use position shown in FIG. 3. It is thus possible to turn the seat back 12 to its non-use position in the upper part of the cabin while folding the seat cushion 13 right on the seat back 12

In the automobile in this embodiment, it may be ensured that as the handle arm 16 is turned from its storage position to its use position in the state that the seat back 12 is locked in its use position by the second locking element 24 and the seat cushion 13 is locked in its use position by the first locking element 23, the first locking element 23 is first unlocked. And, so that the second locking element 24 may then be unlocked, the seat 11 is provided with an unlocking means for unlocking the first and second locking elements 23 and 24 in cooperation with the handle arm 16 that turns.

Mention is next made to make the aforesaid unlocking means more apparent with respect to its specific makeup. The unlocking means comprises a first and a second pole 26 and 33 and a first and a second spring means 28 and 35, as mentioned above. More specifically, the unlocking means includes a first pole 26 supported on the seat cushion 13 rotatably between an engagement position at which the first pole 26 is engaged with an engagement portion 29 of the first locking element 23 for holding the first locking element 23 in its locking position and a disengagement position at which the first pole 26 is disengaged from the engagement portion 29 the first locking element 23 for permitting the first locking element 23 to turn to its unlocking position. The unlocking means also includes a second pole 33 supported on the seat back 12 rotatably between an engagement position at which the second pole 33 is engaged with an engagement portion 36 of the second locking element 24 for holding the second locking element 24 in its locking position and a disengagement position at which the second pole 33 is disengaged from the engagement portion 36 of the second locking element 24 for permitting the second locking element to turn to its unlocking position. The unlocking means also includes a first spring means 28 for urging the first locking element 23 to turn towards its unlocking position and urging the first locking element 23 and the first pole 26 to turn towards a direction in which the first locking element 23 and the first pole are engaged with each other. The unlocking means further includes a second spring means for urging the second locking element 24 to turn towards its unlocking position and urging the second locking element 24 and the second pole 33 towards a direction in which the second locking element 24 and the second pole are engaged with each other.

Figure 8:
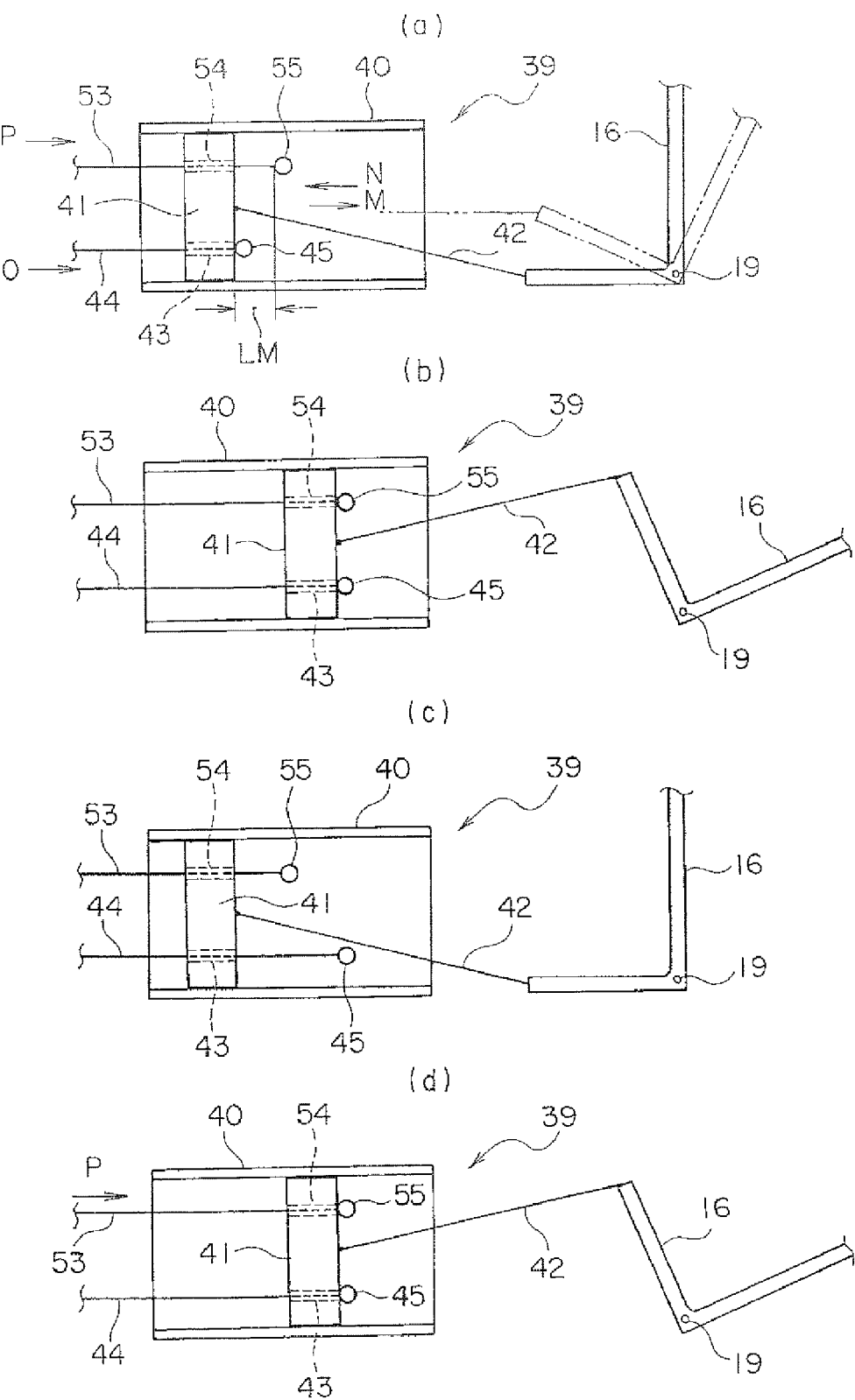
FIG. 8 shows explanatory view illustrating operations of the a handle arm and a slider.

The unlocking means further includes a time lag generator 39 which as shown on simplification in FIG. 4 is disposed inside of the seat back 12. FIG. 8 shows on simplification the time lag generator 39. As shown in FIG. 8, the time lag generator 39 comprises a guide frame 40 fixed to the frame of the seat back 12 and a slider 41 guided by the guide frame to slidably move in directions M and N between a home position as shown in FIG. 8(a) and a working position as shown in FIG. 8(b). The slider 41 and the handle arm 16 are securely tied to the two ends of a solid wire 42 as a first connector means, respectively, the wire 42 extending through the inside of the seat back 12.

When the handle arm 16 is in its storage position as shown by the broken lines in FIG. 1 and by the solid line in FIG. 8, the slider 41 is in its home position. And, when the handle arm 16 is turned to its use position shown in FIGS. 2 and 8(b), the slider 41 is pulled by the wire 42, moving to its working position. When the handle arm 16 is turned to its storage position again, the slider 41 is pushed by the wire 42, returning to the home position shown in FIG. 8(a).

Thus, the unlocking means in this embodiment comprises a slider 41 supported on the seat back 12 via a guide frame 40 so as to be movable between its home and working positions and a first connector means interconnecting the slider 41 and the handle arm 16 so that the slider 41 takes its home position when the handle arm 16 is in its storage position and that the slider 41 takes its working position when the handle arm 16 is turned to its use position. The first connector means comprises a first wire 42 whose two ends are connected to the handle arm 16 and the slider 41, respectively.

On the other hand, as shown in FIG. 8, through a through hole 43 formed in the slider 41 a second wire 44 as a second connector means is slidably fitted. The second wire 44 as shown in FIG. 4 extends in the inside of the seat back 12 and the seat cushion 13, comes out of the seat cushion 13 and extends along a side of the seat cushion 13, having one end securely tied to the first pole 26 as shown in FIGS. 4 and 5. The second wire 44 has the other end side as mentioned above is slidably fitted through the through hole 43 formed in the slider 41 shown in FIG. 8 and the other end which is securely connected to a small block 45 whose diameter is larger than the diameter of the through hole 43. In the example shown in FIG. 8(*a*), when the handle arm 16 is in its storage position and consequently the slider 41 is in its home position, the small block 45 is either in contact with or close to the slider 41.

Here, in the state as shown in FIG. 1 the seat back 12 is locked in its use position by the second locking element 24 and moreover the seat cushion 13 is locked in its use position by the first locking element 23 by an operator commences turning the handle arm 16 from its storage position as mentioned before. Then, the slider 41 pulled by the first wire 42 will begin to slide moving in the direction indicated by the arrow M in FIG. 8(*a*). Then, the slider 41 hitting on the small block 45 securely connected to the other end of the second wire 44 will pull the second wire 44 in the direction indicated by the arrow O in FIGS. 8(*a*) and 5(*a*). This will cause the first pole 26 shown in FIG. 5(*a*) to begin turning in the direction indicated by the arrow I. When the handle arm 16 turns to an intermediate position between the storage and use positions as shown by the two-dot chain lines in FIGS. 1 and 8(*a*) and the slider 41 reaches a position between its home and working positions, the first pole 26 will be disengaged from the engagement portion 29 of the first locking element 23, thus turning to the disengagement position. This will cause the first locking element 23 to turn to its unlocking position, thereby unlocking the seat cushion 13. The seat cushion 13 will thus be turned from its use position shown in FIG. 1 to its non-use position shown in FIG. 2 under the aforesaid spiral spring action. Then, the seat back 12 will remain locked by the second locking element 24 and locked in the use position shown in FIG. 2, hence at rest. Mention will be made later of the unlocking operation for the seat back 12.

The unlocking means in this embodiment thus includes the second connector means for interconnecting the slider 41 and the first pole 26. With the state that the seat back 12 is locked in its use position by the second locking element 24 and the seat cushion 13 is locked in its use position by the first locking element 23, the handle arm 16 which has begun turning from its storage position reaches a position between the storage and use positions. And consequently when the slider 41 moves to a position between its home and working positions, the first pole 26 may be turned to its disengagement position at which it is disengaged from the engagement portion 29 of the first locking element 23 to allow the first locking element 23 to turn to its unlocking position under the action of the first spring means. Moreover, the second connector means comprises a second wire 44 which has one end securely connected to the first pole 26 and has the other end side passing through the slider 41 so as to be slidable relative to the slider and has the other end securely connected to a small block 45.

Figure 9:
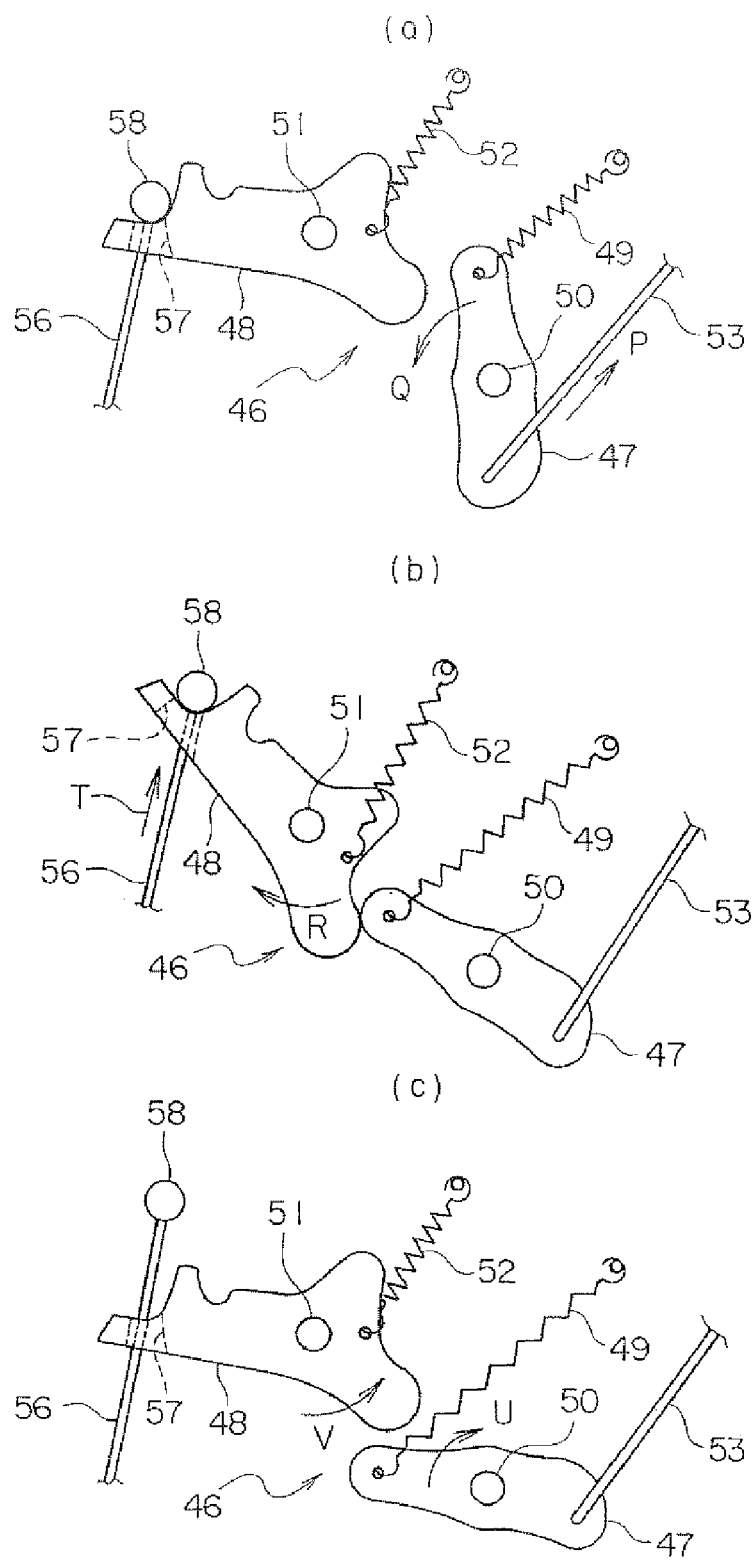
FIG. 9 shows explanatory view illustrating operations of a first and a second rotary arm.
Figure 10:
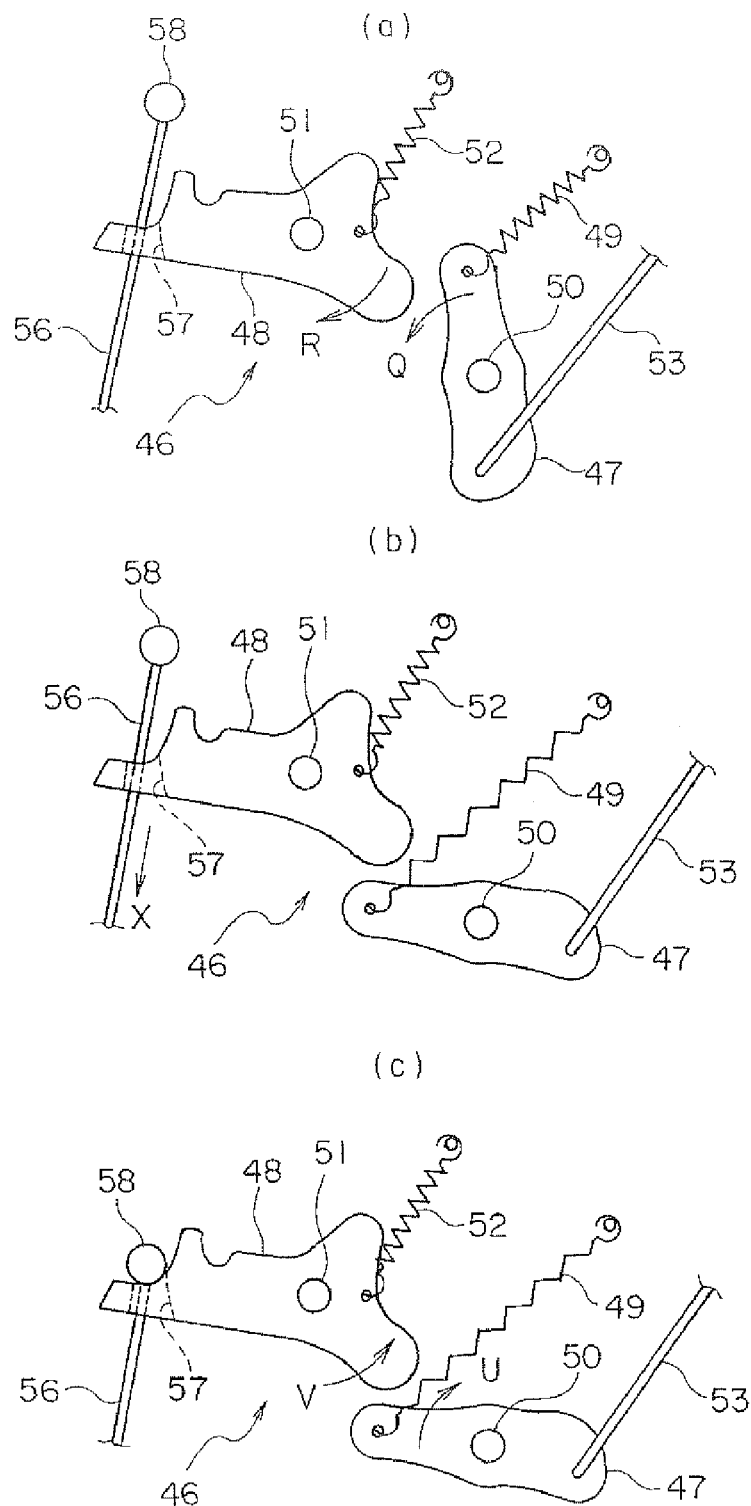
FIG. 10 shows explanatory view illustrating operations of a first and a second rotary arm.

Also, the unlocking means in this embodiment may, as shown on simplification in FIG. 4, include a rotary arm unit 46 having a plurality of rotary arms (not shown in FIG. 4) provided in the inside of the seat back 12. FIGS. 9 and 10 show explanatory views specifically illustrating the rotary arm unit 46. As shown in FIGS. 9 and 10, the rotary arm 46 comprises a first rotary arm 47 and a second rotary arm 48 supported on the frame of the seat back 12 by means of pins 50 and 51, respectively. To the first rotary arm 47 and the frame of the seat back 12, the two ends of a third spring means 49 constituted by a tension spring are tied, respectively. The first rotary arm 47 is energized by the third spring means 49 to turn clockwise as seen in FIGS. 9 and 10, but normally, hitting on a stopper (not shown), it remains at rest at its initial position as shown in FIG. 9(*a*). Likewise, to the second rotary arm 48 and the frame of the seat back 12 are tied the two ends of a fourth spring means 52 constituted by a tension spring, respectively. Then, when the second rotary arm 48 is at its initial position shown in FIG. 9(*a*), the fourth spring means 52 is set free so that the second rotary arm 48 may not be energized anyway. The second rotary arm 48 is thus held at its initial position.

Further, to the first rotary arm 47 as shown in FIG. 9(*a*) is securely tied one end of a third wire 53 as a third connector means. The third wire 53 extends through the inside of the seat back 12 and has the other end side which as shown in FIG. 8(*a*) is slidably fitted in a through hole 54 formed in the slider 41. The third wire 53 has the other end securely connected to a small block 55 whose diameter is larger than the diameter of the through hole 54. Then, when the seat back 12 is locked in its use position by the second locking element 24 and the seat cushion 13 is locked in its use position by the first locking element 23 while the handle arm 16 is in its storage position as shown in FIG. 8(*a*), the small bock 45 securely connected to the other end of the second wire 44 is closer in position to the slider in its home position that the small block 55 securely connected to the other end of the third wire 53. The one small bock 45 and the other small block 55 are spaced apart by a distance LM.

Further, as shown in FIG. 6, the second pole 33 has one end of a fourth wire 56 as a fourth connector means securely connected thereto. The other end side of the fourth wire 56 as shown in FIG. 9(*a*) is slidably fitted in a through hole 57 formed in the second rotary arm 48. The fourth wire 56 has its other end securely connected to a small block 58 whose diameter is larger than the diameter of the through hole 57. When the second pole 33 is in its engagement position shown in FIG. 6(*a*) and the second rotary arm 48 is in its initial position shown in FIG. 9(*a*), the small block 58 is in contact with or close to the second rotary arm 48.

As shown in FIG. 1, in the state that the seat back 12 and the seat cushion 13 are in their use position while the handle arm 16 is in its storage position, the operator may turn the handle arm 16 to cause the slider 41 to move from its home position shown in FIG. 8(*a*) towards its working position shown in FIG. 8(*b*). Then, as mentioned before, the slider 41 on hitting on the small block 45 securely connected to the other end of the second wire 44 will pull the second wire 44 in the direction of arrow O. This will disengage the first pole 26 from the engagement portion 29 of the first locking element 23, turning the first locking element 23 to its unlocking position shown in FIG. 5(*b*). In this way, when the handle arm 16 is turned to an intermediate position between its storage and use positions as indicated by the two-dot chain lines in FIGS. 1 and 8(*a*), the first locking element 23 and hence the seat cushion 13 will be unlocked. In this way, after the slider 41 begins to pull the second wire 44, the slider 41 on hitting the small block 55 securely connected to the other end of the third wire 53 will pull the third wire 53 in the direction indicated by the arrow P in FIGS. 8(*a*) and 9(*a*). This will cause the first rotary arm 47 which has been at its initial position shown in FIG. 9(*a*) to be pulled by the third wire 53, to begin turning in the direction of arrow Q and then, hitting on the second rotary arm 48 which has been at its initial position, turn the second rotary arm 48 in the direction of arrow R as shown in FIG. 9(*b*). In this way, the first rotary arm 47 after turning the second rotary arm 48 will get over the second rotary arm 48 and releases the pushing force to the second rotary arm 48. When the handle arm 16 is turned to its use position, thus the slider 41 reaching its working position shown in FIG. 8(*b*), the first rotary arm 47 will reach its terminal position shown in FIG. 9(*c*) to stop there. When the first rotary arm 47 releases the pushing force to the second rotary arm 48, the second rotary arm 48 will, by the action of the fourth spring means 52, be turned in the direction opposite to that indicated by the arrow R in FIG. 9(*b*), thus turning to its initial state shown in FIG. 9(*c*) to stop there.

As mentioned above, when the second rotary arm 48 pushed by the first rotary arm 47 is turned from its initial position, the second rotary arm 48 will push the small block 58 securely connected to the other end of the fourth wire 56, pulling the fourth wire 56 in the direction indicated by the arrow T in FIGS. 6(*a*) and 9(*b*). This will turn the second pole 33 shown in FIG. 6(*a*) around the pin 34 in the direction of arrow J to disengage its hook from the engagement portion 36 of the second locking element 24. This will in turn cause the second locking element 24 as mentioned before to be turned to its unlocking position shown in FIG. 6(*b*), thereby unlocking the seat back 12. Thus, the seat back 12 can be turned towards its non-use position shown in FIG. 3.

As mentioned above, the slider 41 is moved from its home position to its working position to pull the third wire 53. This will cause the first rotary arm 47 and second rotary arm 48 to be turned from their initial positions. And, the small block 58 of the fourth wire 56 when hitting on the second rotary arm 48 is pushed to pull the fourth wire 56. Accordingly, the second pole 33 is disengaged from the engagement portion 36 of the second locking element 24 to unlock the seat back 13. Then, as the slider 41 is moved from its home to working position, the second wire 44 and the third wire 53 are pulled sequentially with a time difference by first pulling the wire 44 and then pulling the wire 53. Thus, the seat cushion 13 is first unlocked after which the seat back 12 is unlocked. Accordingly, it is possible to operate smoothly to first turn the seat cushion 13 to its non-use position shown in FIG. 2 and then to turn the seat back 12 towards its non-use position shown in FIG. 3.

Also, after the first rotary arm 47 gets over the second rotary arm 48, the second rotary arm 48 is turned by the fourth spring means 52 to its initial position shown in FIG. 9(*c*). The second rotary arm 48 then will not push the fourth wire 56 anyway, however. As a consequence, the second locking element 24 will be in its unlocking position shown in FIG. 6(*b*) and the first pole 26 will be held in its disengagement position in contact with the second locking member 24. Thus, if the second rotary arm 48 is turned to its initial position, the fourth wire 56 remains unworked; as shown in FIG. 9(*c*), the second rotary arm 48 returned to its initial position and the small block 58 securely connected to the fourth wire 56 are largely spaced apart from each other.

As mentioned above, the unlocking means in this embodiment includes: a first rotary arm 47 supported on the seat back 12 rotatably between its initial and terminal positions; a third connector means connected to the slider 41 and the first rotary arm 47 so that the slider 41 can move from its home position towards its working position; a third spring means 49 for energizing the first rotary arm 47 to turn in a direction in which the first rotary arm 47 turns to its initial position; a second rotary arm 48 rotatably supported on the seat back 12; a fourth spring means 52 for energizing the second rotary arm 48 to turn in a direction in which the second rotary arm 48 turns to its initial position; and a fourth connector means for coupling the small block 58 and the second pole 33 together so that where the seat back 12 is locked in its use position by the second locking element 24, when the first rotary arm 47 which starts to turn from its initial position to its terminal position as the handle arm 16 starts to turn from its storage position and pushes the second rotary arm 48 in its initial position to turn the second rotary arm 48, the second pole 33 is disengaged from the engagement portion 36 of the second locking element 24 to permit the second locking element 24 under the action of the second spring means 35 to turn to its unlocking position but where the second locking element 24 is in its unlocking position, if the second rotary arm 48 under the action of the fourth spring means 52 turns to its initial position, the second pole 33 remains in its disengagement position.

Moreover, in this unlocking means the first and second rotary arms 47 and 48 are established in position so that when the first rotary arm 47 turns from its initial to terminal position, the first rotary arm 47 pushes the second rotary arm to turn the second rotary arm 48 and thereafter gets over the second rotary arm 48 to release the pushing force to the second rotary arm 48 so that the second rotary arm 48 under the action of the fourth spring 52 turns to its initial position.

Besides, in this unlocking means, the second and third connector means and the slider 41 are constructed to regulate the timings to start rotating the first pole 26 and the first rotary arm 47 so that; where the seat back 12 is locked in its use position by the second locking element 24 and the seat cushion 13 is locked in its use position by the first locking element 23, when the handle arm 16 starts turning from its storage position to use position; and when the slider 41 moves from its home position to working position, the first pole 26 is first disengaged from the engagement portion 29 of the first locking element 23 and then the second pole 33 is disengaged from the engagement portion 36 of the second locking element 24.

Further, the third connector means comprises a third wire 53 having one end securely connected to the first rotary arm 47 and its other end side passing through the slider 41 so as to be slidable relative to the slider 41 and having the other end securely connected to a small block 55. The fourth connector means comprises a fourth wire 56 having one end securely connected to the second pole 33 and the other end side passing through the second rotary arm 48 so as to be slidable relative to the second rotary arm 48 and also having the other end securely connected to a small block 58.

Apropos, after turning the seat back 12 together with the seat cushion 13 to its non-use position shown in FIG. 3, the operator turns the handle arm 16 in the direction of arrow H to store it in its storage position. Then, as the handle arm 16 is turned to its storage position, the slider 41 pushed by the first wire 42 is returned from its working position shown in FIG. 8(*b*) to its home position shown in FIG. 8(*c*). Since the third wire is then freed from its constraint by the slider 41, the first rotary arm 47 under the action of the third spring means 49 is allowed to turn in the direction indicated by the arrow U in FIG. 9(*c*) and returned to its initial position shown in FIG.

10(a) to return the third wire 53 to its initial position shown in FIG. 8(c). At this time, the first rotary arm 47 pushes the second rotary arm 48, stopped in its initial position, to turn it in the direction of arrow V. Then, riding across the second rotary arm 48, the first rotary arm 47 turns to its initial position shown in FIG. 10(a). Moreover, as the first rotary arm 47 riding across the second rotary arm 48 releases the pushing force to the second rotary arm 48, the second rotary arm 48 under the action of the fourth spring means 52 is turned in the direction opposite to the arrow V, returning to its initial position shown in FIG. 10(a). When the second rotary arm 48 is turned in this way, the second rotary arm 48 does not hit on the small block 58 securely connected to the fourth wire 56. And, the second locking element 24 is in its unlocking position shown in FIG. 6(b) and the second ball 33 in contact with the second locking element 24 is held in its disengagement position. Thus, the second rotary arm 48 if turned as mentioned above may only slide relative to the fourth wire 56 and the fourth wire 56 does not work.

As mentioned above, the first and second rotary arms 47 and 48 are set up in position so that when the first rotary arm 47 is turned from its terminal to initial position, too, the first rotary arm 47 after pushing the second rotary arm 48 to turn the second rotary arm 48 may return to its initial position upon riding across the second rotary arm 48.

On the other hand, when the slider 41 returns from its working position shown in FIG. 8(b) to it home position shown in FIG. 8(c) as the handle arm 16 in its use position shown in FIG. 3 is turned in the direction of arrow H into its storage position, since the first locking element 23 is in its unlocking position shown in FIG. 5(b) and the first pole 26 in contact with the first locking element 23 is held in its disengagement position, the slider 41 merely slides relative to the second wire 44 and does not act on the second wire. In this way, the second connector means constituted by the second wire 44 is arranged to interconnect the slider 41 and the first pole 26 so that where the first locking element 23 is in its unlocking position, if the handle arm 16 is turned from its use position to its storage position to return the slider 41 to its home position, the first pole 26 may remain in its disengagement position.

In lifting down the seat back 12 and the seat cushion 13 from the position in the upper part of the cabin downwards, the handle arm 16 in its storage position is unlocked on turning the locking hook (not shown) and is turned in the direction opposite to the arrow H and brought to its use position. This will cause the slider 41 to move to its working position again which is shown in FIG. 8(d). This in turn causes the third wire 53 in the position shown in FIG. 8(c) to be pulled again in the direction of arrow P and to move to the position shown in FIG. 8(d). Consequently, the first rotary arm 47 in its initial position shown in FIG. 10(a) will turn again in the direction of arrow Q to turn the second rotary arm 48 in the direction of arrow R and, then riding across the second rotary arm 48, will reach its terminal position shown in FIG. 10(b) and stop there. In this case, too, once the first rotary arm 47 across over the second rotary arm 48, the second rotary arm 48 by the action of the fourth spring means 52 is returned to its initial position shown in FIG. 10(b). At this time, since the small block 58 securely connected to the fourth wire 56 is not pushed by the second rotary arm 48 and the second wire 44 is not moved by the slider 44, the first and second locking elements 23 and 24 remain in their unlocked positions shown in FIGS. 5(b) and 6(b).

In contrast to this, if the handle arm 16 is turned from its storage position to its use position shown in FIG. 3, then a third locking element 61 (FIG. 1) provided for the seat back 12 is disengaged from a third striker 62 securely connected to the car body as will be described later, thereby unlocking the seat back 12.

Then, the operator grips the handle arm 16 with hand, turning the seat back 12 together with the seat cushion in the direction indicated by the barrow F in FIG. 3, to bring the seat back 12 to its use position shown in FIG. 2. When the seat back 12 comes to a position just prior to its use position, a contact area 59 of the second locking element 24 shown in FIG. 6(b) hits on the second striker 38 shown in FIG. 6(a) whereby the second locking element 24 in its unlocking position turns in the direction indicated by the arrow W in FIG. 6(b) against the action of the second spring means 35. As a consequence, when the seat back 12 reaches its use position, the second locking element 24 turns to its locking position shown in FIG. 6(a) to engage its engagement recess 37 with the second striker 38 while turning the second ball 33 in the direction opposite to the arrow J under the pulling action of the second spring means 35 to engage its hook with the engagement portion 36 of the locking element 24. That is, the second pole 33 turns to its engagement position. In this manner, the seat back 12 is locked in its use position.

When the second locking element 24 is turned from its unlocking position to its locking position to turn the second pole 33 to its engagement position as mentioned above, the fourth wire 56 is pulled by the second pole 33 in the direction indicated by the arrow X in FIGS. 6(b) and 10(b). When the second pole 33 was in its disengagement position, however, the small block 58 securely connected to the fourth wire 56 was spaced apart from the second rotary arm 48 in its initial position shown in FIG. 10(b). Thus, if the fourth wire 56 is pulled in the direction of arrow X, the fourth wire 56 merely slide relative to the second rotary arm 48 so that the second rotary arm 48 does not rotate. By the second locking element 24 turning to its locking position and the fourth wire 56 pulled in the direction of arrow X, the small block 58 securely connected thereto is either in contact with, as shown in FIG. 10(c), or close to, the second rotary arm 48. In this way, while the handle arm 16 is held in its use position, merely turning the seat back 12 from its non-use position to its use position allows automatically locking the seat back 12 to the car body 1.

As mentioned above, when the seat back 12 is turned from its non-use position to its use position, the second locking element 24 hits on the second striker 38 and then moves the second striker 38 to engage its recess 37 with the second striker and allows the second pole 33 under the action of the second spring means 35 to be engaged with the engagement portion 36 of the second locking element 24, thereby locking the seat back to the car body 1.

Next, the operator pushes the handle arm 16 in its use position as shown in FIG. 2 forwards of the car body to turn it in the direction opposite to the arrow G, storing the handle arm 16 in its storage position. With this operation, the slider 41 pushed by the first wire 42 is moved from its working position shown in FIG. 8(d) to its home position shown in FIG. 8(c). Then, as the slider 41 slides along to the second wire 44, the second wire 44 does not move and stays in the position shown in FIG. 8(c).

In contrast to this, when the slider 41 is returned to its home position shown in FIG. 8(c), the first rotary arm 47, shown in FIG. 10(c) under the action of the third spring means 49, is energizing to turn in the direction of arrow U and, riding across or getting over the second rotary arm 48, returns to its initial position. This causes the second wire 53 to move to the initial position shown in FIG. 8(c). Then, too, the second rotary arm 48 pushed by the first rotary arm 47 is turned in the direction of arrow V and thereafter returned to its initial position again by the action of the fourth spring means 52. Then, the second rotary arm 48 does not push the small block 58 securely connected to the fourth wire 56, and the fourth wire 56 does not moved.

As mentioned above, when the handling arm 16 is stored from its use position to its storage position, the operator pushes the handle arm 16 forwards. Then, as the seat back 12 has been locked to the car body 1, the seat back 12 is not movable in the direction indicated by the arrow E in FIG. 2 under the pushing force applied to the handle arm 16. Thus, the handle arm 16 can easily be turned to its storage position.

Next, the seat cushion 13 is turned in the direction of arrow D to be brought to its use position shown in FIG. 1. Then, when the seat cushion 13 comes to a position just prior to its use position, the contact area 60 of the first locking element 23 shown in FIG. 5(b) hits on the first striker 31 shown in FIG. 5(a) whereby the first locking element 23 that has been in its unlocking position is turned in the direction of arrow Y against the action by the first spring means 28. As a consequence, when the seat cushion 13 comes to its use position, the first locking element 23 is turned to its locking position shown in FIG. 5(a) to engage its engagement recess 30 with the first striker 31 while turning the first pole 26 in the direction opposite to the arrow I under the pulling action of the first spring means 28 so that its hook is brought into engagement with the engagement portion 29 of the first locking element 23. That is, the first pole 26 is turned to its engagement position. Thus, the seat cushion 13 is locked in its use position.

As mentioned above, when the first pole 26 is turned to its engagement position, as the second wire 44 is pulled in the direction indicated by the arrow Z in FIG. 5(b), the first locking element 23 is returned to its locking position. And, when the first pole 26 is turned to its engagement position, the second wire 44 has been moved to the initial position shown in FIG. 8(a). In this way, all the components are returned to the positions shown in FIGS. 1, 5(a), 6(a) and 8(a).

As mentioned above, when the seat cushion 13 is turned from its non-use position to its use position, the first locking element 23 upon hitting on the first striker 31 is turned to engage its engagement recess 30 with the first striker 31 and to engage the first pole 26 with the engagement portion 29 of the first locking element 23 under the action of the first spring means 28, thereby locking the seat cushion 13 to the car body 1.

While mention was made hereinbefore of the first and second locking elements 23 and 24 and their associated components which are provided at one of the two vehicle-widthwise seat sides, the automobile in this embodiment has the first and second locking element and their associated components also at the other vehicle-widthwise seat side, which are identical in makeup to the aforesaid first and second locking elements 23 and 24 and their associated components of which repeated description is omitted.

Also, the first and second locking elements 23 and 24 and the first and second poles 26 and 33 as well as the wires which are disposed at a side of the seat cushion 13 and the seat back is in part covered with a covering so as not to be touched directly.

Mention is now made of the third locking element 61 which has been described briefly, and of its associated components.

Figure 11:
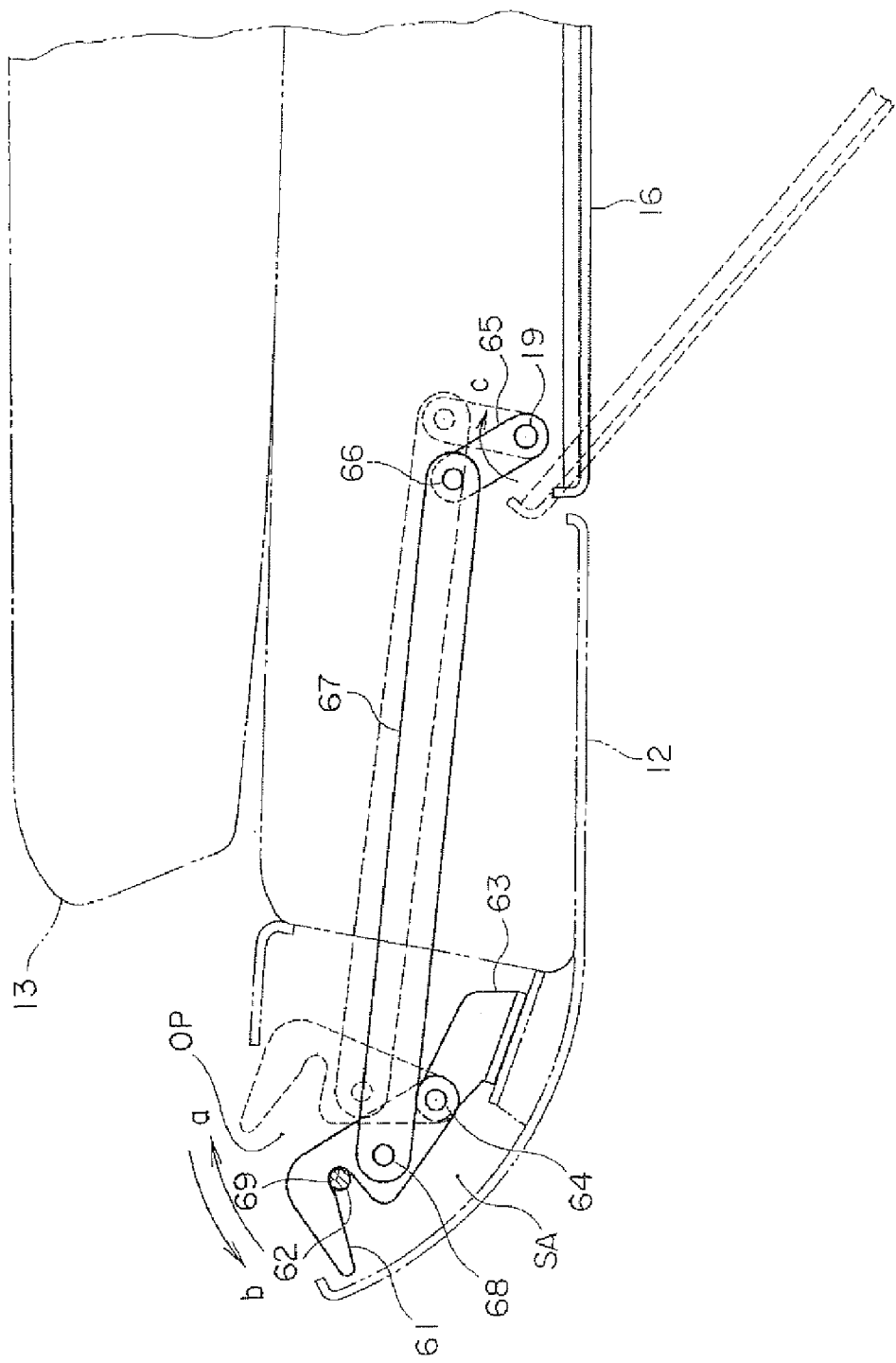
FIG. 11 is an explanatory view illustrating and operation of a third locking element.

As shown in FIG. 1, the third locking element 61 is arranged internally of the seat back 12. FIG. 11 is a view which makes the third locking element 61 and its associated components apparent in makeup where the seat back 12 and the seat cushion 13 lifted up to the non-use position are indicated by the imaginary lines. This third locking element 61 is disposed in a void space SA formed on the base side of the seat back 12 and is supported via pins 64 rotatably in the directions of arrows "a" and "b" on a base block 63 securely connected to the seat back 12.

On the other hand, the handle arm 16 is securely connected to the pin 19 mentioned before, which is rotatably supported on the frame of the seat back 12. In FIG. 11, for explanation, the handle arm 16 is shown spaced apart from the pin 19. Securely connected to the pin 19 is the base end of a first link 65 to whose tip end is connected one end of a second link 67 so as to be rotatable relative thereto. The other end side of the second link 67 is connected via another coupling pin 68 to the third locking element 61 so as to be rotatable relative thereto.

When the handle arm 16 is stored in its storage position indicated by the solid lines in FIG. 11, the first and second links 65 and 67 and the third locking element 61 are in the positions indicated by the solid lines in FIG. 11. Then, an engagement recess 69 formed on the third locking element 61 is engaged with the third striker 62 securely connected to the inner panel 2A of the roof panel 2 (FIG. 1) constituting the car body whereby the seat back 12 together with the seat cushion 13 are locked in its non-use position. A part of the third striker 62 comes into the void space SA of the seat back 12 through an opening OP thereof so that the third locking element 61 engages with a region of the third striker. The position which the third locking element 61 then takes is its locking position. The third striker 62 as shown in FIG. 7 is shaped substantially identically to the first and second strikers 31 and 32 and its base ends 81A are fastened to the inner panel of the roof panel while its chip end 81B is engaged with the third locking element 61.

If the handle arm 16 is turned as indicated by the broken lines in FIG. 11 to its use position, the pin 19 is rotated as the handle arm 16 is moved and the first link 65 securely connected to the pin 19 is consequently turned in the direction of arrow c to take a position indicated by the broken lines. With this, the second link 67 is moved, too, to a position indicated by the broken lines to turn the third locking element 61 in the direction of arrow "a". This disengages the engagement recess 69 of the third locking element 61 from the third striker 62 as indicated by the broken lines in FIG. 11, thus unlocking the seat back 12. The position the third locking element 61 then takes is its unlocking position. Unlocking the seat back 12 in this way allows the operator on gripping the handle arm 16 in its use position to turn the seat back 12 together with the seat cushion 13 to the use position shown in FIG. 2.

When the seat back 12 together with the seat cushion 13 is brought again to the non-use position shown in FIGS. 3 and 11 and handle arm 16 is stored in its storage position indicated by the solid lines in FIG. 11, the first and second links 65 and 67 are moved to the position indicated by the solid lines to turn the third locking element 61 in the direction of arrow "b" to its locking position and to engage its engagement recess 69 with the third striker 62, thereby locking the seat back 12 in the non-use position.

The first and second links 65 and 67 and the connecting pins 66 and 68 show an interlocking state or link means in accordance with turning the third locking element 61.

As mentioned above, the automobile according to this embodiment comprises: a locking element 61 which when a seat member comprising the seat back 12 is in its non-use position, is engaged with a striker 62 securely connected to the car body 1 for locking the seat member to the car body 1, wherein the locking element 61 is supported on the seat back 12 rotatably between a locking position at which its engagement recess 69 is engaged with the striker 62 to lock the seat member in its non-use position and an unlocking position at which the engagement recess 69 is disengaged from the striker 62 to unlock the seat member from the car body; and an interlocking or link means provided for the seat member comprising the seat back 12 for turning or acting on the locking member 61 in linkage with turning of the handle arm 16 so that when a handling arm 16 is in its use position, the locking element 61 takes its unlocking position and when the handle arm 16 is turned to its storage position, the locking element 61 takes its locking position.

When the seat back 12 and the seat cushion 13 folded on each other as shown in FIG. 2 are together turned to the non-use position shown in FIG. 3, a driving force by a gas damper stay (not shown) is utilized. Then, due to a reduced internal pressure of the gas damper stay, there may be the case that the seat back 12 together with the seat cushion 13 fails to be completely turned to the non-use position shown in FIG. 3 and stops turning just in front of the position. A similar situation may occur if the seat back 12 is so configured that it should be lifted up, exclusively by an operator's human power or by a spring force or the like other than of the gas damper stay. In such a case, it is not simply easy for the seat back 12 and the seat cushion 13 lifted to just ahead of the non-use position to be lifted further up to the non-use position by a human power alone.

Accordingly, the automobile in this embodiment is so configured that if the seat back 12 with the seat cushion 13 moved up by the operator with the handle arm 16 in its use position has released moving just ahead of the non-use position, the seat back 12 together with the seat cushion 13 can spontaneously (automatically) continue to be turned to the non-use position simply by the operator turning the handle arm 16 to its storage position. A specific configuration is detailed below.

Figure 12:
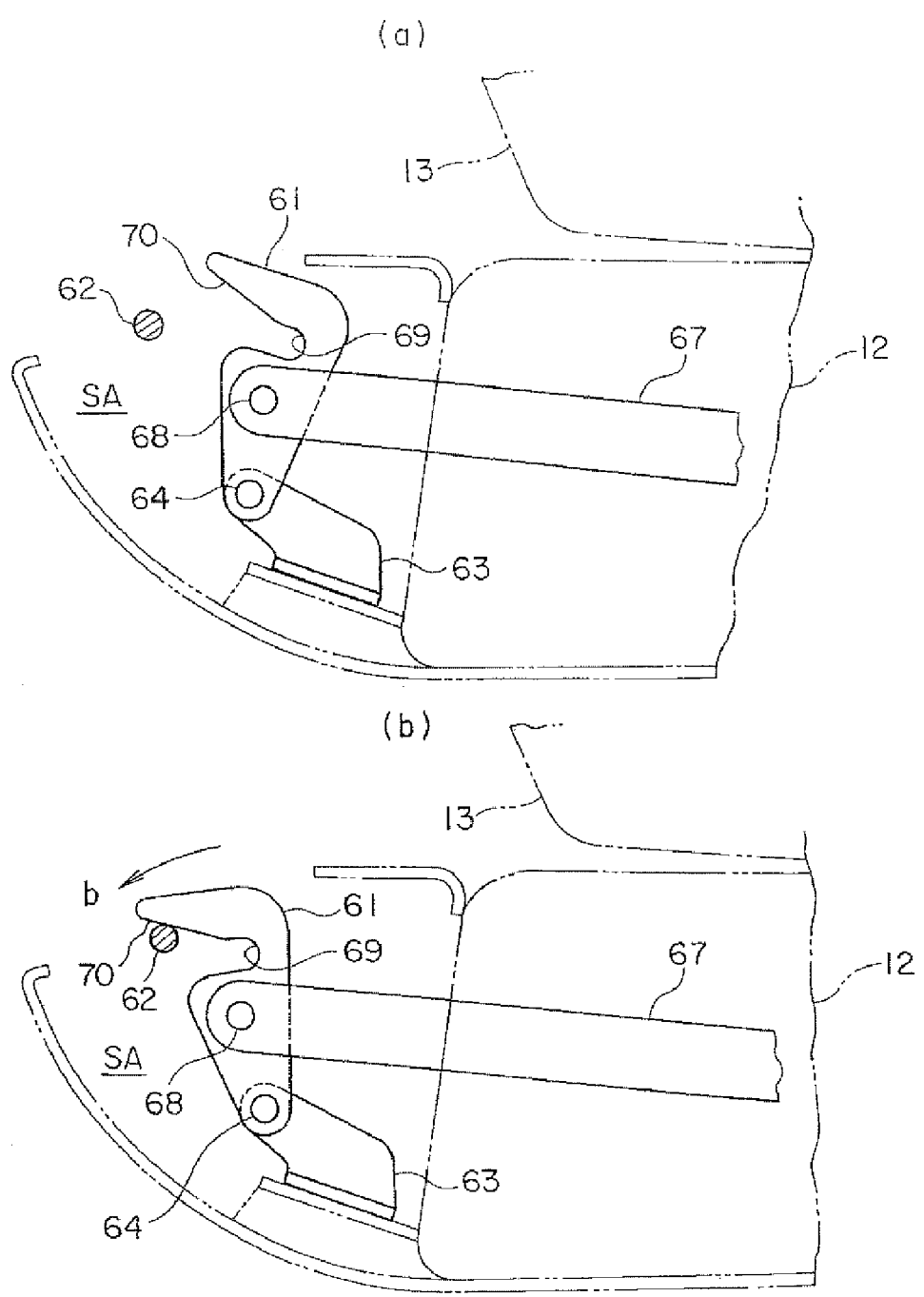
FIG. 12 shows explanatory view illustrating how a guide surface formed on the third locking element works.

FIG. 12(*a*) shows a state that the seat back 12 moved up by the operator with the handle arm 16 in its use position has stoped just ahead of the non-use position. The handle arm 16 not shown in the Figure is assumed to lie in its use position shown in FIG. 3. In this situation, the operator turns the handle arm 16 in the direction indicated by the arrow H in FIG. 3, then the third locking element 61 as shown in FIG. 12(*b*) will turn a little in the direction of arrow "b" to bring its engagement recess on a guide surface 70 in contact with the third striker 62. In this state, further turning the handle arm 16 towards its storage position will cause the third locking element 61 to turn further in the direction of b and the guide surface 70 to slide on the third striker 62. Thus, the seat back 12 together with the seat cushion 13 will continue to turn to the non-use position and the engagement recess 69 of the third locking element 61 will engage with the third striker 62 as shown in the solid lines in FIG. 11. Then, the seat back 12 together with the seat cushion 13 is brought to the non-use position. Thus, simply by turning the handle arm 16 from its use position to its storage position, the seat back 12 which has stopped at a position just ahead of the non-use position can be lifted up to the non-use position, thus turning the seat bag 12 easily to the non-use position.

As mentioned above, the automobile according to this embodiment has a locking element 61 formed with a guide surface 70 on which a striker 62 can slide to engage an engagement recess 69 of the locking element 61 with the striker 62 when the handling arm 16 is turned from its use position towards its storage position so as to turn the locking element 61 from its unlocking position to its locking position, if with the handling arm 16 brought in its use position, a seat member comprising the seat back 12 is turned from its use position towards its non-use position and releases turning at a position just ahead of the non-use position.

While in FIG. 11 a single third locking element 61 is shown provided, a plurality of third locking elements may be provided which are spaced apart from one another vehicle-widthwise and each of which is operable in linkage with turning of the handle arm 16 as mentioned above, to permit the seat back 12 in its non-use position to be locked in a state higher in stability.

While the present invention has hereinbefore been described for a seat member as a seat back 12 that can be lifted up and locked in its non-use position, the invention is equally applicable if the seat member is a seat cushion supporting the hip of person.

What is claimed is:

1. An automobile equipped with a seat member that is disposed in a cabin movably between its use position adapted to support a seated person and its non-use position in an upper part of the cabin, comprising:
    a seat arm supported to be rotatable about a center of turning on a car body and coupled to the seat member so that the seat member is movable to the center of turning with a variable distance between the seat member and the center of turning as a seat distance; and
    a guide for guiding the seat member so as to gradually decrease the seat distance as the seat member moves from the use position to the non-use position and to gradually increase the seat distance as the seat member moves from the non-use position to the use position,
    wherein the guide comprises a guide groove formed in an interior material disposed inside of the car body or the cabin thereof and the seat member has a protruding pin,
    wherein the pin is slidably fitted in the guide groove,
    whereby when the seat member is moved between the use position and the non-use position, the pin slides moving in the guide groove to decrease or increase the seat distance.

2. An automobile as set forth in claim 1, further comprising a spring for energizing the seat member towards its center of turning of the seat arm when the seat member is moved from the use position to the non-use position.

3. An automobile as set forth in claim 2 wherein the seat arm has a hollow part and the seat member has a slide element securely connected to a frame of the seat member,
    wherein the slide element is slidably fitted in the hollow part, the hollow part accommodates the spring for energizing the slide element towards the center of turning of the seat arm.

4. An automobile as set forth in any one of claims 1, 2, and 3 wherein the seat member is a seat back supporting the back of a seated person.

5. An automobile as set forth in claim 3, comprising:
    a seat cushion supporting the hip of the seated person, wherein the seat cushion is connected to the seat back to be rotatable between a use position adapted for the seated person to be seated thereon and an non-use position in which the seat cushion is folded on the seat back, the seat back is disposed in the cabin so that with the seat cushion folded on the seat back, the seat back together with the seat cushion is movable between the use position and the non-use position at which the seat back with the seat cushion folded thereon is lifted up in the upper part of the cabin; and
    a handle arm disposed on a rear side of the seat back which is opposite to the surface supporting the back of the seated person wherein the handle arm is coupled to the seat back to be rotatable between its storage position in which the handle arm lies along the rear side of the seat back where base ends of the handle arm lie lower than its free end of the handle arm and its use position of the handle arm at which the free end lies spaced apart from the rear side of the seat back.

6. An automobile as set forth in claim 1, wherein the seat member comprises a seat back supporting the back of a seated person and a seat cushion supporting the hip of the seated person;

the seat cushion includes a first locking element rotatably attached to a cushion frame; and the car body is provided with a first striker engageable with the first locking element, whereby when the seat cushion is in its use position, the first locking element is engaged with the first striker to lock the seat cushion to the car body.

7. An automobile as set forth in claim 6, comprising:

a first pole disposed adjacent to the first locking element and supported rotatably on the cushion frame of the seat cushion and a first spring whose ends are attached the first locking element and the first pole, respectively, whereby when the first striker of the car body is engaged with the first locking element, the first pole is held engaged with the first locking element under an action of the first spring to inhibit the first locking element from rotating.

8. An automobile as set forth in claim 7 wherein the first pole has a hook and the first locking element has a cutout, whereby when the first striker of the car body is engaged with the first locking element, the hook of the first pole is held engaged with the cutout of the first locking element under the action of the first spring.

9. An automobile as set forth in claim 8, comprising a handle arm disposed on a rear side of the seat back which is opposite to the surface supporting the back of the seated person wherein the handle arm is coupled to the seat back to be rotatable between its storage position in which the handle arm lies along the rear side of the seat back in the use position where its base ends lie lower than its free end and its use position at which the free end lies spaced apart from the rear side of the seat back, whereby when the handle arm is turned from its storage position towards its use position, the first pole rotates the first locking element to unlock the seat cushion.

10. An automobile as set forth in claim 6 wherein the seat back includes a second locking element rotatably attached to a frame of the seat back and the car body is provided with a second striker engageable with the second locking element, whereby when the seat back is in its use position, the second locking element is engaged with the second striker to lock the seat back to the car body.

11. An automobile as set forth in claim 10, comprising:

a second pole disposed adjacent to the second locking element and supported rotatably on the frame of the seat back and a second spring whose ends are attached to the second locking element and the second pole, respectively, whereby when the second striker of the car body is engaged with the second locking element, the second pole is held engaged with the second locking element under an action of the second spring to inhibit the second locking element from rotating.

12. An automobile as set forth in claim 11 wherein the second pole has a hook and the second locking element has a cutout, whereby when the second striker of the car body is engaged with the second locking element, the hook of the second pole is held engaged with the cutout of the second locking element under the action of the second spring.

13. An automobile as set forth in claim 12, comprising a handle arm disposed on a rear side of the seat back which is opposite to the surface supporting the back of the seated person wherein the handle arm is coupled to the seat back to be rotatable between its storage position in which the handle arm lies along the rear side of the seat back in the use position where base ends of the handle arm lie lower than its free end and its use position at which the free end lies spaced apart from the rear side of the seat back, whereby when the handle arm is turned from its storage position towards its use position, the second pole rotates the second locking element to unlock the seat back.

14. An automobile as set forth in claim 13, comprising:

a time lag generator to have a difference in time between unlocking the first locking element and unlocking the second locking element, whereby when the handle arm is turned from its storage position towards its use position, the first locking element is first unlocked followed by the second locking element which is unlocked later with a time difference.

15. An automobile having a seat member comprising a seat back supporting a back of a seated person and being retractable from its use position adapted to support the seated person for storing in its non-use position in an upper part of a cabin, comprising:

a seat arm to be rotatable attached to a car body and to support the seat back so as to be movable and variable in position relative to the seat arm;

a pin securely mounted on a lower end of the seat back; and a guide for guiding movement of the pin on the seat back as the seat arm is turned, wherein the guide comprises a guide groove formed in an interior material disposed inside of the car body or the cabin thereof.

16. An automobile as set forth in claim 15 wherein the guide groove is in the form of an arc having its center at a point lying rearwards of a center of turning of the seat arm so that as the seat member is moved from use position to the non-use position, the distance between the center of turning and the seat back is gradually reduced.

17. An automobile as set forth in any one of claims 15 and 16 wherein:

the seat member further comprises a seat cushion supporting the hip of the seated person;

the seat cushion includes a first locking element for locking the seat cushion to the car body; and the seat back includes a second locking element for locking the seat back to the car body.

18. An automobile as set forth in claim 17, comprising a time lag generator to have a difference in time between unlocking the first locking element and unlocking the second locking element, whereby firstly the first locking element is unlocked, secondly the second locking element is unlocked with a time difference.

* * * * *